US012755054B2

(12) United States Patent
Jones et al.

(10) Patent No.: US 12,755,054 B2
(45) Date of Patent: Oct. 6, 2026

(54) ACCESS CONTROL OF DATA BASED ON PURPOSE AND/OR CONSENT

(71) Applicant: OneTrust, LLC, Atlanta, GA (US)

(72) Inventors: Kevin Jones, Atlanta, GA (US); Haribalan Raghupathy, Atlanta, GA (US); Matthew Hennig, Atlanta, GA (US); Jonathan Blake Brannon, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 1 day.

(21) Appl. No.: 18/832,856

(22) PCT Filed: Jan. 24, 2023

(86) PCT No.: PCT/US2023/011446
§ 371 (c)(1),
(2) Date: Jul. 24, 2024

(87) PCT Pub. No.: WO2023/146854
PCT Pub. Date: Aug. 3, 2023

(65) Prior Publication Data
US 2025/0094634 A1 Mar. 20, 2025

Related U.S. Application Data

(60) Provisional application No. 63/302,819, filed on Jan. 25, 2022.

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS 12,131,819 B1 * 10/2024 Murray ............ G06F 16/24564
12,147,548 B1 * 11/2024 Pena .................. G06F 21/6245
(Continued)

FOREIGN PATENT DOCUMENTS

CA 3056394 A1 * 3/2021 .......... G06F 11/3698

OTHER PUBLICATIONS

Hammer E et al: "The OAuth 2.0 Authorization Framework; draft-ietf-oauth-v2-27. txt", The Oauth 2.0 Authorization Framework; DRAFT-IETF-OAUTH-V2-27.TXT, Internet Engineering Task Force, IETF; STANDARDWORKINGDRAFT, Internet Society (ISOC) 4, Rue Des Falaises CH-1205 Geneva, Switzerland, Jun. 8, 2012 (Jun. 8, 2012), pp. 1-71, XP015083227, [retrieved on Jun. 8, 2012] the whole document.

(Continued)

*Primary Examiner* — Stephen T Gundry
(74) *Attorney, Agent, or Firm* — Ballard Spahr LLP

(57) ABSTRACT

Aspects of the present invention provide methods, apparatuses, systems, computing devices, computing entities, and/or the like for implementing and managing access to particular data based on access controls for implementing purpose restrictions and/or consent restrictions. In various aspects, a method is provided that comprises: receiving a request transmitted by an application executing on a client computing system and requesting access to a dataset, wherein each data record of the dataset comprises data elements; identifying, based on the application, a purpose for the application requesting access to the dataset; referencing, based on the purpose, an applicable purpose-based access-control policy to identify an authorization token; and providing the authorization token, wherein the storage computing system provides the client computing system with a view of the dataset based on the token with the view having (Continued)

a data element returning modified data in a manner compliant with the applicable purpose-based access-control policy.

18 Claims, 9 Drawing Sheets

(56) References Cited

U.S. PATENT DOCUMENTS

| | | | | |
|---|---|---|---|---|
| 12,284,281 | B1 * | 4/2025 | Jain | H04L 9/3213 |
| 12,309,236 | B1 * | 5/2025 | Frazier, Jr. | G06F 16/9535 |
| 12,321,497 | B1 * | 6/2025 | Hotchkies | G06F 21/6263 |
| 12,407,701 | B1 * | 9/2025 | Varakantam | H04L 67/306 |
| 2018/0082024 | A1 * | 3/2018 | Curbera | G06F 21/00 |
| 2018/0285592 | A1 | 10/2018 | Sharifi et al. | |
| 2019/0294822 | A1 | 9/2019 | Hennebert | |
| 2021/0165899 | A1 * | 6/2021 | Joshipura | G06F 16/144 |
| 2021/0192082 | A1 | 6/2021 | Jones et al. | |
| 2021/0314328 | A1 | 10/2021 | Simons | |
| 2021/0350022 | A1 | 11/2021 | Brannon et al. | |
| 2022/0001663 | A1 | 1/2022 | Brannon et al. | |
| 2022/0247753 | A1 * | 8/2022 | Dunjic | H04L 63/102 |
| 2022/0335119 | A1 * | 10/2022 | Kudo | G06F 21/604 |
| 2024/0419706 | A1 * | 12/2024 | Gutierrez | G06F 3/0484 |
| 2025/0005038 | A1 * | 1/2025 | Khurana | G06F 21/6218 |
| 2025/0030675 | A1 * | 1/2025 | Dunjic | H04L 63/0853 |
| 2025/0119433 | A1 * | 4/2025 | Alden | G06F 21/62 |
| 2025/0124045 | A1 * | 4/2025 | Shtern | G06F 16/256 |
| 2025/0148100 | A1 * | 5/2025 | Srivastava | G06F 16/906 |
| 2025/0158842 | A1 * | 5/2025 | Ricotta | G06F 16/27 |
| 2025/0181735 | A1 * | 6/2025 | Lu | G06F 21/604 |
| 2025/0217369 | A1 * | 7/2025 | Colcord | G06F 16/221 |
| 2025/0252203 | A1 * | 8/2025 | Bennati | G06F 21/604 |
| 2025/0278496 | A1 * | 9/2025 | Lu | G06F 21/604 |
| 2025/0278516 | A1 * | 9/2025 | Salmon | G06F 21/6245 |

OTHER PUBLICATIONS

PCT Application No. PCT/US2023/011446 International Search Report and Written Opinion of the International Searching Authority dated Aug. 9, 2023.

* cited by examiner

ACCESS CONTROL OF DATA BASED ON PURPOSE AND/OR CONSENT

CROSS-REFERENCE TO RELATED APPLICATIONS

This application claims the benefit of U.S. Provisional Patent Application Ser. No. 63/302,819, filed Jan. 25, 2022, which is hereby incorporated herein by reference in its entirety.

TECHNICAL FIELD

The present disclosure is generally related to computing systems and methods for implementing and managing access controls for the protection of data, hardware, and/or software from maliciously cause destruction, unauthorized modification, and/or unauthorized disclosure.

BACKGROUND

Various technical challenges are often encountered in many storage computing systems in implementing and managing reliable access controls for data that is stored, handled, processed, transferred, and/or the like involving data sources found on the storage computing systems. Firstly, this is because data is not all the same. That is to say, a first type of data may require a first set of access controls and a second, different type of data may require a second, different set of access controls. Therefore, a significant technical challenge encountered in many storage computing systems is implementing and managing various sets of access controls required for the different types of data that are handled by the storage computing systems.

Secondly, access to certain data may be subject to a purpose for accessing the data. For example, access to certain data can be driven by the reason for accessing the data. That is to say, access to certain data can be driven for what the data is being used for, as well as who is requesting access to the data. Accordingly, different access controls can be needed, even for the same data, based on different purposes for accessing the data. Therefore, a significant technical challenge encountered in many storage computing systems is implementing and managing various access controls required for different purposes for accessing data handled by the storage computing systems.

Thirdly, access to certain data may be driven by consent provided by entities (e.g., individuals) associated with the data. For example, regulations such as the General Data Protection Regulation (GDPR) afford individuals with rights to define what their personal data can be used for (e.g., for what purposes) by an organization who has collected the personal data on the individuals. An individual has the right to "opt" in or out of different purposes for which the organization can process the individual's personal data. While the organization may collect the individual's consent for these various purposes, the organization can find it a considerable challenge to implement the consent for the various purposes in different computing systems, processing workflows, and/or the like that involve using the various purposes. Therefore, a significant technical challenge encountered in many storage computing systems is implementing and managing various access controls to data that account for consent with respect to various purposes that can vary greatly among entities with respect to providing access to the data. Therefore, a need exists in the art for meeting the technical challenges in implementing and managing access controls for storage computing systems that handle data that is subject to having such controls in place for administering access to the data.

SUMMARY

In general, various aspects of the present invention provide methods, apparatuses, systems, computing devices, computing entities, and/or the like for implementing and managing access to particular data based on access controls for implementing purpose restrictions and/or consent restrictions. In various aspects, a method is provided that comprises: receiving a request associated with an application that is executing on a client computing system and requesting access to a dataset comprising a plurality of data records handled by a storage computing system, wherein each data record of the plurality of data records comprises a plurality of data elements; identifying, based on the application, a purpose for the application requesting access to the dataset; referencing, based on the purpose, an applicable purpose-based access-control policy to identify an authorization token; and providing the authorization token to at least one of the client computing system or the storage computing system, wherein the storage computing system provides, based on the authorization token, the client computing system with a view of the dataset having a data element of the plurality of data elements returning modified data in a manner that is compliant with the applicable purpose-based access-control policy.

In some aspects, returning modified data in the manner that is compliant with the applicable purpose-based access-control policy comprises generating the modified data by at least one of anonymizing data returned for the data element, truncating the data returned for the data element, or obfuscating the data returned for the data element. In some aspects, identifying the purpose of the application requesting access to the dataset comprises: accessing a data model for the client computing system, wherein the data model identifies a plurality of processing activities executing on the client computing system and involving the dataset; identifying the application as a particular processing activity of the plurality of processing activities; and identifying the purpose based on an attribute defined in the data model for the particular processing activity.

In some aspects, the method further comprises: accessing a plurality of data sources used on the storage computing system for handling the dataset; identifying that the data element of the plurality of data elements is used for a type of data that is subject to the applicable purpose-based access-control policy; generating the view of the dataset to have the data element containing the modified data in the manner that is compliant with the applicable purpose-based access-control policy; and generating the authorization token for the view of the dataset. In some aspects, generating the view of the dataset comprises providing the storage computing system with instructions to construct the view of the dataset on the storage computing system.

In various aspects, a system comprising a processing device configured to perform one or more of the steps of the method is provided. In various aspects, a non-transitory computer readable medium storing computer-executable instructions that, when executed by computer hardware, configure the computer hardware to carry out one or more of the steps of the method is provided.

In various aspects, a system is provided that comprises a non-transitory computer readable medium storing instructions and a processing device communicatively coupled to the non-transitory computer-readable medium. Accordingly, the processing device is configured to execute the instructions and thereby perform operations comprising: receiving a request associated with an application that is executing on a client computing system and requesting access to a dataset comprising a plurality of data records handled by a storage computing system, wherein each data record of the plurality of data records comprises a plurality of data elements; identifying, based on the application, a purpose for the application requesting access to the dataset; referencing, based on the purpose, an applicable purpose-based access-control policy to identify an authorization token; and providing the authorization token to at least one of the client computing system or the storage computing system, wherein the storage computing system provides, based on the authorization token, the client computing system with a view of the dataset having a data element of the plurality of data elements returning modified data in a manner that is compliant with the applicable purpose-based access-control policy.

In some aspects, returning modified data in the manner that is compliant with the applicable purpose-based access-control policy comprises generating the modified data by at least one of anonymizing data returned for the data element, truncating the data returned for the data element, or obfuscating the data returned for the data element. In some aspects, identifying the purpose of the application requesting access to the dataset comprises: accessing a data model for the client computing system, wherein the data model identifies a plurality of processing activities executing on the client computing system and involving the dataset; identifying the application as a particular processing activity of the plurality of processing activities; and identifying the purpose based on an attribute defined in the data model for the particular processing activity.

In some aspects, the operations further comprises: accessing a plurality of data sources used on the storage computing system for handling the dataset; identifying that the data element of the plurality of data elements is used for a type of data that is subject to the applicable purpose-based access-control policy; generating the view of the dataset to have the data element containing the modified data in the manner that is compliant with the applicable purpose-based access-control policy; and generating the authorization token for the view of the dataset. In some aspects, generating the view of the dataset comprises providing the storage computing system with instructions to construct the view of the dataset on the storage computing system.

In various aspects, a non-transitory computer-readable medium storing computer-executable instructions is provided. Accordingly, the computer-executable instructions, when executed by computing hardware, configure the computing hardware to perform operations comprising: receiving a request associated with an application that is executing on a client computing system and requesting access to a dataset comprising a plurality of data records handled by a storage computing system, wherein each data record of the plurality of data records comprises a plurality of data elements; identifying, based on the application, a purpose for the application requesting access to the dataset; referencing, based on the purpose, an applicable purpose-based access-control policy to identify an authorization token; and providing the authorization token to at least one of the client computing system or the storage computing system, wherein the storage computing system provides, based on the authorization token, the client computing system with a view of the dataset having a data element of the plurality of data elements returning modified data in a manner that is compliant with the applicable purpose-based access-control policy.

In some aspects, returning modified data in the manner that is compliant with the applicable purpose-based access-control policy comprises generating the modified data by at least one of anonymizing data returned for the data element, truncating the data returned for the data element, or obfuscating the data returned for the data element. In some aspects, identifying the purpose of the application requesting access to the dataset comprises: accessing a data model for the client computing system, wherein the data model identifies a plurality of processing activities executing on the client computing system and involving the dataset; identifying the application as a particular processing activity of the plurality of processing activities; and identifying the purpose based on an attribute defined in the data model for the particular processing activity.

In some aspects, the operations further comprises: accessing a plurality of data sources used on the storage computing system for handling the dataset; identifying that the data element of the plurality of data elements is used for a type of data that is subject to the applicable purpose-based access-control policy; generating the view of the dataset to have the data element containing the modified data in the manner that is compliant with the applicable purpose-based access-control policy; and generating the authorization token for the view of the dataset. In some aspects, generating the view of the dataset comprises providing the storage computing system with instructions to construct the view of the dataset on the storage computing system.

In various aspects, a method is provided that comprises: identifying, based on consent data for a data subject, that a first consent has not been obtained from the data subject for processing data for a first purpose associated with a first consent-based access-control policy; identifying, based on the consent data, that a second consent has been obtained from the data subject for processing the data for a second purpose associated with a second consent-based access-control policy; generating, based on the first consent not being obtained for processing the data for the first purpose and the second consent being obtained for processing the data for the second purpose, a consent tag for the data subject, wherein the consent tag comprises a data structure identifying the first purpose and first consent data for the first purpose and the second purpose and second consent data for the second purpose; and providing the consent tag to a storage computing system, wherein the consent tag is associated with a data record for the data subject found in a plurality of data records of a dataset handled by the storage computing system, and associating the consent tag with the data record causes: (a) the data record to be excluded from results of a first query of the dataset returned for the first purpose based on the first consent data, and (b) the data record to be included in second results of a second query of the dataset returned for the second purpose based on the second consent data.

In various aspects, a system comprising a processing device configured to perform one or more of the steps of the method is provided. In various aspects, a non-transitory computer readable medium storing computer-executable instructions that, when executed by computer hardware, configure the computer hardware to carry out one or more of the steps of the method is provided.

In various aspects, a system is provided that comprises a non-transitory computer-readable medium storing instructions and a processing device communicatively coupled to the non-transitory computer-readable medium. Accordingly, the processing device is configured to execute the instructions and thereby perform operations comprising: identifying, based on consent data for a data subject, that a first consent has not been obtained from the data subject for processing data for a first purpose associated with a first consent-based access-control policy; identifying, based on the consent data, that a second consent has been obtained from the data subject for processing the data for a second purpose associated with a second consent-based access-control policy; generating, based on the first consent not being obtained for processing the data for the first purpose and the second consent being obtained for processing the data for the second purpose, a consent tag for the data subject, wherein the consent tag comprises a data structure identifying the first purpose and first consent data for the first purpose and the second purpose and second consent data for the second purpose; and providing the consent tag to a storage computing system, wherein the consent tag is associated with a data record for the data subject found in a plurality of data records of a dataset handled by the storage computing system, and associating the consent tag with the data record causes: (a) the data record to be excluded from results of a first query of the dataset returned for the first purpose based on the first consent data, and (b) the data record to be included in second results of a second query of the dataset returned for the second purpose based on the second consent data.

In various aspects, a non-transitory computer-readable medium storing computer-executable instructions is provided. Accordingly, the computer-executable instructions, when executed by computing hardware, configure the computing hardware to perform operations comprising: identifying, based on consent data for a data subject, that a first consent has not been obtained from the data subject for processing data for a first purpose associated with a first consent-based access-control policy; identifying, based on the consent data, that a second consent has been obtained from the data subject for processing the data for a second purpose associated with a second consent-based access-control policy; generating, based on the first consent not being obtained for processing the data for the first purpose and the second consent being obtained for processing the data for the second purpose, a consent tag for the data subject, wherein the consent tag comprises a data structure identifying the first purpose and first consent data for the first purpose and the second purpose and second consent data for the second purpose; and providing the consent tag to a storage computing system, wherein the consent tag is associated with a data record for the data subject found in a plurality of data records of a dataset handled by the storage computing system, and associating the consent tag with the data record causes: (a) the data record to be excluded from results of a first query of the dataset returned for the first purpose based on the first consent data, and (b) the data record to be included in second results of a second query of the dataset returned for the second purpose based on the second consent data.

In various aspects, a method is provided that comprises: identifying a data element from a plurality of data elements that is associated with a data type, wherein the plurality of data elements is found in a plurality of data records of a dataset handled by a storage computing system; identifying, based on consent data for a data subject, consent has not been obtained from the data subject for processing data having the data type for a purpose; identifying, based on the purpose, a consent-based access-control policy; generating, based on the consent not being obtained, a consent tag, wherein the consent tag comprises a data structure identifying the purpose and a logical operation comprising a modification to be made to the data returned for the data element as defined by the consent-based access-control policy; and providing the consent tag to the storage computing system, wherein the consent tag is associated with a data record for the data subject of the plurality of data records of the dataset handled by the storage computing system to cause the logical operation to be executed to perform the modification to the data returned for the data element for the data record in a query of the dataset associated with the purpose.

In some aspects, the modification is conducted in a manner that is compliant with the consent-based access-control policy and comprises at least one of anonymizing, truncating, or obfuscating the data returned for of the data element. In various aspects, a system comprising a processing device configured to perform one or more of the steps of the method is provided. In various aspects, a non-transitory computer-readable medium storing computer-executable instructions that, when executed by computer hardware, configure the computer hardware to carry out one or more of steps of the method is provided.

In various aspects, a system is provided that comprises a non-transitory computer-readable medium storing instructions and a processing device communicatively coupled to the non-transitory computer-readable medium. Accordingly, the processing device is configured to execute the instructions and thereby perform operations comprising: identifying a data element from a plurality of data elements that is associated with a data type, wherein the plurality of data elements is found in a plurality of data records of a dataset handled by a storage computing system; identifying, based on consent data for a data subject, consent has not been obtained from the data subject for processing data having the data type for a purpose; identifying, based on the purpose, a consent-based access-control policy; generating, based on the consent not being obtained, a consent tag, wherein the consent tag comprises a data structure identifying the purpose and a logical operation comprising a modification to be made to the data returned for the data element as defined by the consent-based access-control policy; and providing the consent tag to the storage computing system, wherein the consent tag is associated with a data record for the data subject of the plurality of data records of the dataset handled by the storage computing system to cause the logical operation to be executed to perform the modification to the data returned for the data element for the data record in a query of the dataset associated with the purpose. In some aspects, the modification is conducted in a manner that is compliant with the consent-based access-control policy and comprises at least one of anonymizing, truncating, or obfuscating the data returned for of the data element.

In various aspects, a non-transitory computer-readable medium storing computer-executable instructions is provided. Accordingly, the computer-executable instructions, when executed by computing hardware, configure the computing hardware to perform operations comprising: identifying a data element from a plurality of data elements that is associated with a data type, wherein the plurality of data elements is found in a plurality of data records of a dataset handled by a storage computing system; identifying, based on consent data for a data subject, consent has not been obtained from the data subject for processing data having the data type for a purpose; identifying, based on the purpose, a consent-based access-control policy; generating, based on the consent not being obtained, a consent tag, wherein the consent tag comprises a data structure identifying the purpose and a logical operation comprising a modification to be made to the data returned for the data element as defined by the consent-based access-control policy; and providing the consent tag to the storage computing system, wherein the consent tag is associated with a data record for the data subject of the plurality of data records of the dataset handled by the storage computing system to cause the logical operation to be executed to perform the modification to the data returned for the data element for the data record in a query of the dataset associated with the purpose. In some aspects, the modification is conducted in a manner that is compliant with the consent-based access-control policy and comprises at least one of anonymizing, truncating, or obfuscating the data returned for of the data element.

In various aspects, a method is provided that comprises: identifying, based on an identifier received for a data subject originating from a storage computing system, consent data for the data subject; identifying an applicable consent-based access-control policy; identifying, based on the consent data, consent has not been obtained from the data subject for processing data for a purpose associated with the applicable consent-based access-control policy; generating, based on the consent not being obtained for processing the data for the purpose, consent-based access-control policy data for the data subject, wherein the consent-based access-control policy data comprises a logical operation for the purpose; and providing the consent-based access-control policy data to the storage computing system, wherein the storage computing system processes a query of a dataset for the purpose, the dataset comprising a plurality of data records, to cause the logical operation to be executed to exclude a data record associated with the data subject found in the plurality of data records from the query.

In various aspects, a system comprising a processing device configured to perform one or more of the steps of the method. In various aspects, a non-transitory computer-readable medium storing computer-executable instructions that, when executed by computer hardware, configure the computer hardware to carry out one or more of the steps of the method is provided.

In various aspects, a system is provided that comprises a non-transitory computer-readable medium storing instructions and a processing device communicatively coupled to the non-transitory computer-readable medium. Accordingly, the processing device is configured to execute the instructions and thereby perform operations comprising: identifying, based on an identifier received for a data subject originating from a storage computing system, consent data for the data subject; identifying an applicable consent-based access-control policy; identifying, based on the consent data, consent has not been obtained from the data subject for processing data for a purpose associated with the applicable consent-based access-control policy; generating, based on the consent not being obtained for processing the data for the purpose, consent-based access-control policy data for the data subject, wherein the consent-based access-control policy data comprises a logical operation for the purpose; and providing the consent-based access-control policy data to the storage computing system, wherein the storage computing system processes a query of a dataset for the purpose, the dataset comprising a plurality of data records, to cause the logical operation to be executed to exclude a data record associated with the data subject found in the plurality of data records from the query.

In various aspects, a non-transitory computer-readable medium storing computer executable instructions is provided. Accordingly, the computer-executable instructions, when executed by computing hardware, configure the computing hardware to perform operations comprising: identifying, based on an identifier received for a data subject originating from a storage computing system, consent data for the data subject; identifying an applicable consent-based access-control policy; identifying, based on the consent data, consent has not been obtained from the data subject for processing data for a purpose associated with the applicable consent-based access-control policy; generating, based on the consent not being obtained for processing the data for the purpose, consent-based access-control policy data for the data subject, wherein the consent-based access-control policy data comprises a logical operation for the purpose; and providing the consent-based access-control policy data to the storage computing system, wherein the storage computing system processes a query of a dataset for the purpose, the dataset comprising a plurality of data records, to cause the logical operation to be executed to exclude a data record associated with the data subject found in the plurality of data records from the query.

In various aspects, a method is provided that comprises: identifying, based on an identifier received for a data subject originating from a storage computing system, consent data for the data subject; identifying an applicable consent-based access-control policy; identifying, based on the consent data, consent has not been obtained from the data subject for processing data having a data type for a purpose associated with the applicable consent-based access-control policy; generating, based on the consent not being obtained for processing the data having the data type for the purpose, consent-based access-control policy data for the data subject, wherein the consent-based access-control policy data comprises a logical operation for the purpose; and providing the consent-based access-control policy data to the storage computing system, wherein the storage computing system processes a query of a dataset for the purpose, the dataset comprising a data record associated with the data subject, to cause the logical operation to be executed to modify the data returned for a data element associated with the data type of the data record for the query. In some aspects, modifying the data returned for the data element is conducted in a manner that is compliant with the applicable consent-based access-control policy and comprises at least one of anonymizing, truncating, or obfuscating the data returned for the data element.

In various aspects, a system comprising a processing device configured to perform one or more of the steps of the method is provided. In various aspects, a non-transitory computer-readable medium storing computer-executable instructions that, when executed by computer hardware, configure the computer hardware to carry out one or more of the steps of the method is provided.

In various aspects, a system is provided that comprises a non-transitory computer-readable medium storing instructions and a processing device communicatively coupled to the non-transitory computer-readable medium. Accordingly, the processing device is configured to execute the instructions and thereby perform operations comprising: identifying, based on an identifier received for a data subject originating from a storage computing system, consent data for the data subject; identifying an applicable consent-based access-control policy; identifying, based on the consent data, consent has not been obtained from the data subject for processing data having a data type for a purpose associated with the applicable consent-based access-control policy; generating, based on the consent not being obtained for processing the data having the data type for the purpose, consent-based access-control policy data for the data subject, wherein the consent-based access-control policy data comprises a logical operation for the purpose; and providing the consent-based access-control policy data to the storage computing system, wherein the storage computing system processes a query of a dataset for the purpose, the dataset comprising a data record associated with the data subject, to cause the logical operation to be executed to modify the data returned for a data element associated with the data type of the data record for the query. In some aspects, modifying the data returned for the data element is conducted in a manner that is compliant with the applicable consent-based access-control policy and comprises at least one of anonymizing, truncating, or obfuscating the data returned for the data element.

In various aspects, a non-transitory computer-readable medium storing computer executable instructions is provided. Accordingly, the computer-executable instructions, when executed by computing hardware, configure the computing hardware to perform operations comprising: identifying, based on an identifier received for a data subject originating from a storage computing system, consent data for the data subject; identifying an applicable consent-based access-control policy; identifying, based on the consent data, consent has not been obtained from the data subject for processing data having a data type for a purpose associated with the applicable consent-based access-control policy; generating, based on the consent not being obtained for processing the data having the data type for the purpose, consent-based access-control policy data for the data subject, wherein the consent-based access-control policy data comprises a logical operation for the purpose; and providing the consent-based access-control policy data to the storage computing system, wherein the storage computing system processes a query of a dataset for the purpose, the dataset comprising a data record associated with the data subject, to cause the logical operation to be executed to modify the data returned for a data element associated with the data type of the data record for the query. In some aspects, modifying the data returned for the data element is conducted in a manner that is compliant with the applicable consent-based access-control policy and comprises at least one of anonymizing, truncating, or obfuscating the data returned for the data element.

BRIEF DESCRIPTION OF THE DRAWINGS

In the course of this description, reference will be made to the accompanying drawings, which are not necessarily drawn to scale, and wherein.

DETAILED DESCRIPTION

Figure 1:
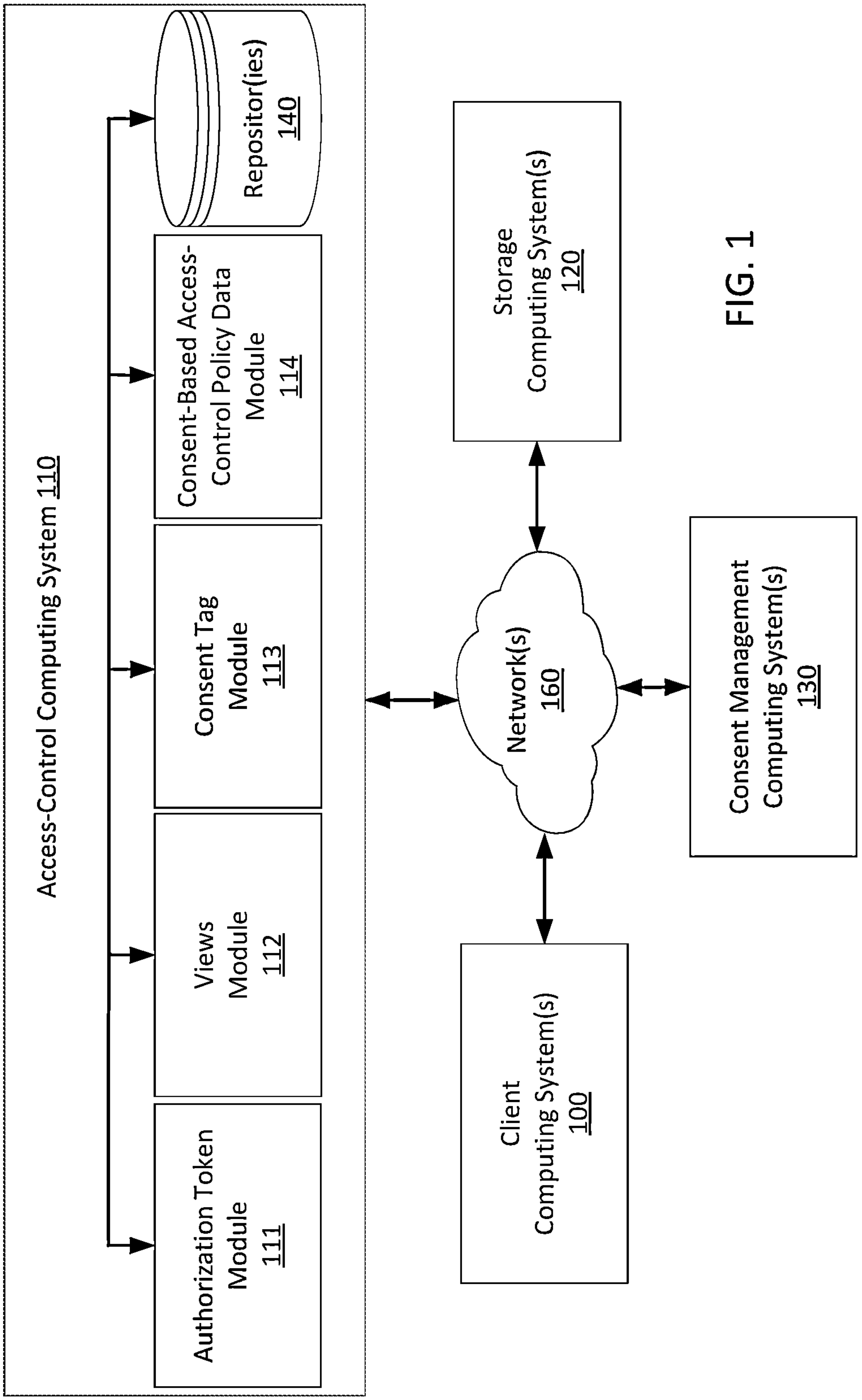
FIG. 1 depicts an example of a computing environment that can be used for implementing and managing access controls for a dataset in accordance with various aspects of the present disclosure.

Various aspects for practicing the technologies disclosed herein are described more fully hereinafter with reference to the accompanying drawings, in which some, but not all aspects of the technologies disclosed are shown. Indeed, various aspects disclosed herein are provided so that this disclosure will satisfy applicable legal requirements and should not be construed as limiting or precluding other aspects applying the teachings and concepts disclosed herein. Like numbers in the drawings refer to like elements throughout.

Overview and Technical Contributions of Various Aspects

As previously noted, various technical challenges often encountered in many storage computing systems are implementing and managing reliable access controls for data that is stored, handled, transferred, and/or the like involving data sources found on the storage computing systems. For instance, many storage computing systems may be used in storing, handling, transferring, and/or the like personal data of individuals. For example, a storage computing system may collect and store credit card data for individuals (e.g., data subjects) who have provided such data to make purchases through e-commerce websites. Often, a data subject is provided with an option to have his or her credit card data stored at the time of purchase so that the data subject is not required to provide the data again for a future purchase. Therefore, the storage computing system used in storing the credit card data must have sufficient access controls in place to ensure the data is not improperly accessed by third parties that are not authorized to do so.

A further technical challenge in implementing and managing access controls is that controlling access to certain data is not a one-size-fits all proposition. Firstly, this is because data is not all the same. That is to say, a first type of data may require a first set of access controls and a second, different type of data may require a second, different set of access controls. For example, the access controls that may need to be put into place for the storage and/or handling of credit card data for data subjects may be quite different than the access controls that may need to be put into place for the storage and/or handling of data on prior purchases made by the data subjects.

Secondly, access to certain data may be subject to a purpose for accessing the data. Returning to the example in which data subjects' credit card data is stored on a storage computing system, the storage computing system may receive a first request for credit card data to use in processing a purchase for a first data subject via a website. The requesting entity would need the entire credit card data to facilitate the purchase. However, the storage computing system may receive a second request for credit card data to use in displaying to a second data subject on the website to remind the data subject of the credit card he or she has saved to use to make purchases. In this instance, the entire credit card data (e.g., entire credit card number) may not necessarily be needed for display to the second data subject. Instead, the second data subject may be able to identify the credit card that has been stored by simply viewing a modified version (e.g., a portion) of the credit card number. Therefore, the different purposes for what the credit card data is being used can impose what access controls need to be in place for the credit card data. Such access controls may not only be applicable with respect to what entity may be requesting access to the data, but may also be applicable to how the data is displayed (e.g., modified) once accessed by the entity. Accordingly, implementing and managing access controls to coordinate proper access to data for the different purposes can prove quite challenging.

Thirdly, access to certain data may be driven by consent provided by data subjects (and/or representatives thereof). For instance, data on a data subject's Internet browsing hi story may be collected and stored (e.g., via tracking technology) and used by various websites in providing, for example, personalized advertisements to the data subject upon visiting the websites. Here, the data subject may be required to provide a particular website (or type of website) with consent to access and use such data in providing the data subject with personalized advertisements. For example, a storage computing system may be used as a centralized repository for storing data on the data subject's Internet browsing history and entities associated with various websites may query the storage computing system to acquire the data. In these instances, the storage computing system must have access controls in place to ensure that the entities that have submitted queries (websites thereof) have proper consent from the data subject to access the data. In some instances, consent to such access may be subject to the purpose of gaining access to the data. For example, a data subject may provide consent to access his or her Internet browsing history for providing certain functionality on a website, but the data subject may not have provided consent to using his or her Internet browsing history for purposes of displaying personalized advertisements to the data subject while visiting the website. In addition, a data subject may provide consent to access a modified version (e.g., redacted version) of his or her data to particular entities and/or for particular purposes. Further, a data subject's preferences with respect to providing and/or withdrawing consent to different entities and/or for various purposes can often change. Accordingly, implementing and managing access controls to coordinate proper access to the data based on data subjects' consent can prove quite challenging.

Various aspects of the present disclosure overcome many of the technical challenges as detailed above. Specifically, various aspects of the present disclosure provide an access-control computing system for assisting various storage computing systems in implementing and managing access controls to various types of data that may be stored, handled, transferred, and/or the like by the storage computing systems. In particular aspects, the access-control computing system facilitates the application of access-control policies, which implement purpose restrictions, that selectively modify datasets returned in response to a query so that the datasets are compliant with the purpose restrictions implemented via the access-control policies. In additional or alternative aspects, the access-control computing system facilitates the application of access-control policies, which implement consent restrictions, that selectively modify datasets returned in response to a query so that the datasets exclude and/or modify records for which appropriate consent has not been obtained.

FIG. 1 depicts an example of a computing environment that can be used for implementing and managing access controls for a dataset that is stored, processed, handled, collected, transferred, revised, and/or the like by a storage computing system 120 according to various aspects. The term "handling" is used throughout the remainder of the specification in discussing various aspects of the disclosure with implementing and managing access controls for the dataset although those of ordinary skill in the art should understand that "handling" may involve performing various types of activities such as processing, handling, collecting, transferring, revising, and/or the like of the dataset.

According to various aspects of the disclosure, the computing environment primarily involves three computing systems concerned with providing and/or gaining access to data records of the dataset in a manner that is compliant with one or more access-control policies that may involve both purpose-based restrictions and consent-based restrictions. The first of these computing systems is a client computing system 100 that is generally involved in requesting access to data records found in the dataset. For instance, the client computing system 100 may be executing an enterprise application (although it may be some other type of application) that performs some type of processing (e.g., processing activity) involving the use of data records found in the dataset. For example, the enterprise application may be an application used in processing purchase orders received through an e-commerce website hosted by the client computing system 100. Here, the dataset may include data records on customers who have made purchases and the data records may include data on the customers necessary for completing the purchases. For example, the data records may include credit card data that has been stored for the customers that can be used in completing the purchases. Therefore, the enterprise application executing on the client computing system 100 may submit a query to request access to data records found in the dataset for the customers who have made purchases on the website.

Here, the client computing system 100 may be associated with a storage computing system 120 that handles the dataset for the client computing system 100 and therefore, the enterprise application executing on the client computing system 100 submits the query to the storage computing system 120. In some instances, the storage computing system 120 may handle additional datasets for the client computing system 100 or for other client computing systems. Thus, the storage computing system 120 may be required to have various access controls (e.g., various sets of access controls) in place for managing access to the different datasets, as well as managing access to the various datasets by the different client computing systems.

The third system involved is an access-control computing system 110 that assists in implementing and managing the access controls for the storage computing system 120. Here, the access-control computing system 110 includes software components and/or hardware components for assisting the storage computing system 120 in implementing and managing the access controls for the dataset. In addition, the access-control computing system 110 may provide one or more interfaces (e.g., application programming interfaces (APIs)) for communicating with and/or accessing the client computing system 100 and/or the storage computing system 120 over one or more network(s) 260. Further, the access-control computing system 110 may provide one or more interfaces in the form of graphical user interfaces from which personnel of the client computing system 100 and/or storage computing system 120 can interact with the access-control computing system 110.

In various aspects, the access-control computing system 110 comprises computing hardware performing a number of different processes in assisting in implementing and managing of access controls for the dataset. In some aspects, the access-control computing system 110 executes an authorization token module 111. The authorization token module 111 receives a request related to the client computing system 100 (e.g., enterprise application executing on the client computing system 100) querying the storage computing system 120 to access (retrieve) data records found in the dataset based on one or more query parameters. The authorization token module 111 identifies a purpose associated with the client computing system 100 querying the storage computing system 120 to access data records found in the dataset and identifies a purpose-based access-control policy corresponding to the purpose. For example, the authorization token module 111 can determine the purpose of the query is to retrieve data records of customers who have made recent purchases in order to access credit card data that has been stored in the dataset to be used in completing the purchases. Here, the data records may also include other sensitive data such as the customers' social security numbers. Therefore, the authorization token module 111 can identify an applicable purpose-based access-control policy to the request that requires the social security numbers to be redacted in the data records returned for the query and provide the client computing system 100 with an authorization token matching a view of the dataset in which the social security numbers of customers are redacted.

In additional or alternative aspects, the access-control computing system 110 also includes a views module 112 used in generating views for implementing one or more purpose-based access-control policies for the dataset and corresponding authorization tokens for the views. A purpose-based access-control policy is implemented to achieve access control of the dataset with respect to a specific purpose for accessing the dataset. For example, if a purpose for accessing the dataset is to retrieve data records of customers to obtain mailing addresses for the customers, then a purpose-based access-control policy may be put in place that requires the customers' credit card data to be redacted from the records returned for the customers since such data is typically considered highly sensitive in nature and there is no need for credit card data in mailing something to the customers.

The views module 112 identifies one or more types of data (data types) found within the dataset that should be subject to access controls and provides recommendations on the purpose-based access-control policies that should be put in place to achieve the corresponding access controls. The views module 112 can then generate one or more views for implementing the recommended purpose-based access-control policies along with corresponding authorization tokens for the views. In some aspects, the views module 112 generates the views by providing instructions to the storage computing system 120 for constructing the views of the dataset and in turn, the storage computing system 120 constructs the views so that they are available through the storage computing system 120.

In additional or alternative aspects, the access-control computing system 110 also includes a consent tag module 113. In some aspects, the consent tag module 113 is used in generating a consent tag for a data subject that facilitates the implementation of one or more consent-based access-control policies based on consent received from the data subject with respect to accessing data records found in the dataset for the data subject. A consent-based access-control policy is implemented to achieve access control for the dataset with respect to data records found in the dataset for a data subject and consent received from the data subject. Accordingly, a consent-based access-control policy can be entity-based, purpose-based, or a combination thereof.

For example, a consent-based access-control policy can allow a particular entity, such as the client computing system 100, access to the data records found in the dataset for a data subject based on the data subject providing appropriate consent for the particular entity. In another example, a consent-based access-control policy can allow multiple entities, such as the client computing system 100, a second, different client computing system, etc., access to the data records found in the dataset for a data subject for a particular purpose based on the data subject providing appropriate consent for the purpose. Yet in another example, a consent-based access-control policy can allow a particular entity, such as the client computing system 100, access to the data records found in the dataset for a data subject for a particular purpose based on the data subject providing appropriate consent for the particular entity and particular purpose.

In some aspects, the consent tag module 113 generates a consent tag for a data subject by accessing consent data for the data subject and applying the consent data to applicable consent-based access-control policies to form a data structure for the consent tag that can provide and/or identify instructions (e.g., logical operations) to perform on the data records of the data subject found in the dataset upon receiving a query for the dataset from a particular entity, for a particular purpose, or a combination thereof. Accordingly, the instructions may entail performing different operations for the data records associated with the data subject. For example, the operations may entail removing the data records entirely from the results (e.g., view) returned for the query. In another example, the operations may entail modifying data displayed for one or more data elements of the data records such as anonymization, truncation, obfuscation, and/or the like of the data displayed for the one or more data elements.

In some aspects, the consent data for the data subject may be accessible through one or more consent management computing systems 130 that collect consent from data subjects through various activities involving the data subjects where requesting consent may be appropriate. For instance, a data subject may be visiting a particular website in which a certain type of data is collected through the website. For example, the website may request consent from the data subject to make use of tracking technology and/or a cookie in tracking browsing activities of the data subject while the data subject navigates through the website and/or other websites. In some instances, a consent management computing system 130 may serve as a central repository for storing, and/or managing consent data for various data subjects. For example, the client computing system 100, along with other client computing systems, may collect consent data from various data subjects through various activities and use the consent management computing system 130 as a central repository for storing and/or managing the collected consent data. Therefore, the access control computing system 110 can access consent data for the various data subjects through the consent management computing system 130 in generating consent tags for the data subjects. In additional or alternative aspects, the access-control computing system 110 and the consent management computing system 130 may be a single computing system.

The consent tag module 113 provides the generated consent tag for the data subject to the storage computing system 120 and the storage computing system 120 associates the consent tag with the data records for data subject found in the dataset. Accordingly, the storage computing system 120 can then reference the consent tag in processing a query received from the client computing system 100 in determining what data records for the data subject should be included in response to the query, as well as how the data records should be displayed, based on consent received from the data subject.

Finally, in additional or alternative aspects, the access-control computing system 110 includes a consent-based access-control policy data module 114. In some aspects, the access-control computing system 110 provides consent tags to the storage computing system 120 that do not include data structures providing instructions for implementing one or more consent-based access-control policies for data subjects, but instead include references to corresponding consent data for the data subjects (e.g., identifiers for the data subject). Therefore, upon the storage computing system 120 receiving a query from the client computing system 100, the access-control computing system 110 can receive data subject identifiers from the storage computing system 120 found in corresponding consent tags for data subjects and in turn, the access-control computing system 110 can process each of the data subject identifiers via the consent-based access-control policy data module 114.

In various aspects, the consent-based access-control policy data module 114 generates consent-based access-control policy data for a data subject associated with an identifier and returns the consent-based access-control policy data to the storage computing system 120. Here, the consent-based access-control policy data module 114 accesses consent data for the data subject and retrieves one or more consent-based access-control policies based on the consent data. In some aspects, the access-control computing system 110 can make use of one or more repositories 140 in storing the consent-based access-control policies and/or consent data for the data subjects, as well as other data that is used in performing operations by the consent-based access-control policy data module 114 or the other modules 111, 112, 113 discussed herein.

The consent-based access-control policy data module 114 then generates the consent-based access-control policy data for the data subject based on the data subject's consent data and applicable consent-based access-control policies and returns the consent-based access-control policy data to the storage computing system 120. Accordingly, the storage computing system 120 can then reference the consent-based access-control policy data in processing the query received from the client computing system 100 in determining whether the data records associated with the data subject should be include in response to the query, as well as how the data records should be displayed.

Figure 2:
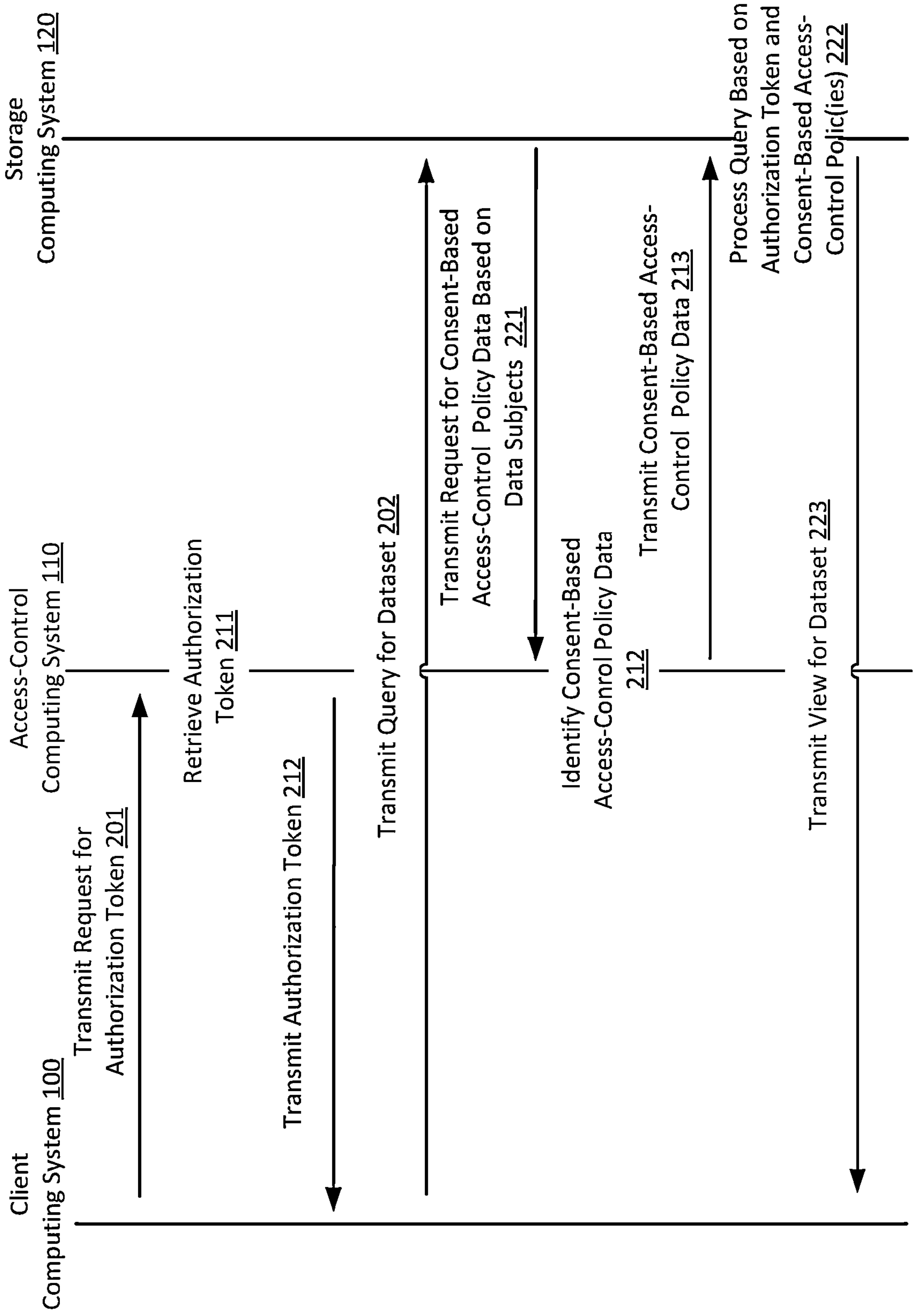
FIG. 2 is an overview of an example end-use case for practicing various aspects of the present disclosure.

Turning to FIG. 2, an overview of an example end-use case for practicing various aspects of the disclosure is shown. For this end-use case, an application executing on a client computing system 100 may require records from a dataset stored on a storage computing system 120. As an illustrative example, the application may be used in sending promotional emails to customers of a banking institution detailing a new mortgage program the banking institution is offering. Here, the application may need records from a dataset stored on the storage computing system 120 containing data on the banking institution's customers to determine who is to receive the emails and then to coordinate sending the emails to the identified customers. In this example, the banking institution is using the storage computing system 120 to store the data on its customers. The data includes various types of data on the customers, some of which is considered personal and/or sensitive in nature. Therefore, the storage computing system 120 is to adhere to various access-control policies (e.g., as required by the banking institution) to ensure that the data is only accessed by authorized entities (e.g., individuals, applications, systems, and/or the like) and for valid purposes.

In various aspects, an access-control computing system 110 is used in facilitating the enforcement and execution of the access-control policies for the data stored by the storage computing system 120. In some aspects, the access-control computing system 110 provides the client computing system 100 (e.g., the application executing on the client computing system 100) with an authorization token that is required to query (e.g., gain access to) data records from the dataset stored by the storage computing system 120. For example, the access-control computing system 110 may receive a request for the authorization token 201, either directly from the client computing system 100 or forwarded from the storage computing system 120.

Upon receiving the request for the authorization token, the access-control computing system 110 retrieves the authorization token 211 that allows the client computing system 100 to query (e.g., access) the data records found in the dataset in a manner compliant with one or more purpose-based access-control policies applicable to the data stored on the storage computing system 120. For instance, the access-control computing system 110 determines that the request is linked to a particular purpose for querying the records for the dataset such as sending promotional emails to the customers represented in the queried data records. Therefore, the access-control computing system 110 obtains the authorization token that permits querying (e.g., accessing) the data records found in the dataset in a manner that is compliant with that purpose and either transmits the authorization token 212 back to the client computing system 100 directly or forwards the authorization token to the storage computing system 120 on behalf of the client computing system 100. If the access-control computing system 110 transmits the authorization token 212 to the client computing system 100, then the client computing system 100 can transmit a query 202 to the storage computing system 120 that may include the authorization token. In other aspects, the access-control computing system 110 may receive the query for the dataset directly from the client computing system 100, retrieve the authorization token 211, and then forward the query along with the authorization token to the storage computing system 120. As a result, the storage computing system 120 retrieves the data records from the dataset for the query in accordance with the authorization token.

For example, the dataset may be stored on a repository on the storage computing system 120 that includes data elements such as customer name, e-mail address, and social security number. A purpose-based access-control policy for the repository may require that the social security number be truncated, obfuscated, hashed or otherwise modified if the dataset is accessed for particular purposes such as using data records found in the dataset for sending promotional emails. In this example, the access-control computing system 110 can provide the storage computing system 120 with an authorization token that identifies a view of the dataset (e.g., data records thereof) in which the social security number for each customer is appropriately truncated, obfuscated, hashed, or otherwise modified.

In additional or alternative aspects, the access-control computing system 110 facilitates purpose-based access control of datasets stored on the storage computing system 120 by creating and using purpose-based access-control policies for the datasets. In addition, the access-control computing system 110 can facilitate the creation of one or more "views" of a dataset stored on the storage computing system 120 that are consistent with the one or more purpose-based access-control policies. In turn, a particular authorization token can indicate a certain view of the dataset stored on the storage computing system 120 that can be accessed with the authorization token.

In addition, various aspects of the disclosure are concerned with controlling access to the datasets (e.g., data records thereof) based on consent. Returning to the illustrative example, the banking institution may be required to have consent from a customer to send the customer the promotional email on the new mortgage product being offered by the banking institution. Here, the access-control computing system 110 can facilitate providing a view of the dataset that is returned to the client computing system 100 that does not include data records of customers who have not provided consent for receiving such emails.

In various aspects, the access-control computing system 110 can make use of access-control policies, which implement consent restrictions, which are applied to datasets to selectively modify the data records of the datasets (e.g., views thereof) returned in response to queries to exclude records for which appropriate consent has not been obtained. In additional or alternative aspects, the access-control computing system 110 can make use of access-control policies that facilitate modifying the data records of the datasets (e.g., views thereof) with respect to certain data elements found in the data records of the datasets in accordance with the applicable access-control policies and absence of appropriate consent.

For example, each of the data records for the different customers of the banking institution can include a consent tag that implements one or more consent-based access-control policies governing how data within that record can be accessed, processed, viewed, and/or the like. Here, the access-control computing system 110 can apply a consent-based access-control policy for a certain customer that permits access to the corresponding one or more records for the customer for a first purpose by the banking institution and requires consent from the customer to permit access to the corresponding one or more records for a second, different purpose by the banking institution.

By the access-control computing system 110 applying the consent-based access-control policy for the certain customer to control access to the customer's data records, the storage computing system 120 can, upon receiving a query for the dataset, determine that a particular data record stored for the customer matches the query parameters for the query. The storage computing system 120 can then reference the consent tag provided for the data record that implements the consent-based access-control policy to determine consent is required to provide the data record for the customer in response to the query. If consent has been received, then the storage computing system 120 responds to the query with a view of the dataset that includes the customer's data record. If consent has not been received, then the storage computing system 120 responds to the query with a view of the dataset that excludes the customer's data record.

In additional or alternative aspects, the access-control computing system 110 can apply a consent-based access-control policy to facilitate the storage computing system 120 including the data record for the customer, but with data displayed for one or more data elements found in the data record modified as indicated by the consent tag and/or a corresponding logical operation. For example, the access-control computing system 110 can apply a consent-based access-control policy along with a corresponding consent tag and/or logical operation that instructs the storage computing system 120 to provide the data record in the view of the dataset returned for the query, but with data displayed for a data element used in storing a telephone number for the customer redacted in the view of the dataset.

In various aspects, the access-control computing system 110 facilitates applying the consent-based access-control policies by providing the storage computing system 120 with consent tags and/or instructions based on the consent tags and appropriate access-control policies. For example, the access-control computing system 110 can apply a consent-based access-control policy for a customer of the banking institution by creating a data structure that includes identifiers for the customer (e.g., email addresses, variants of the customer's name, etc.) and data sources found on the storage computing system 120 in which data about the customer is stored. The access-control computing system 110 can map specific data types to respective purposes for accessing the data. Additionally or alternatively, the access-control computing system 110 can map purposes for accessing the data to corresponding sets of logical operations for modifying certain data elements (e.g., social security number) for the customer. For example, the logical operations can include operations for anonymizing, truncating, obfuscating, and/or the like of data displayed for data elements having certain data types for the customer based on preferences found in consent data for the customer (e.g., a "stop processing," "delete," or "opt-out" preference).

As an example, anonymizing data such as a social security number can involve replacing one or more of the numbers of the social security number with a "common" number such as zero (e.g., 000-00-0000). As an example, truncating data such as a social security number can involve removing one or more numbers of the social security number (e.g., 1234). As an example, obfuscating data such as a social security number can involve replacing one or more of the numbers with a character to make them unrecognizable (e.g., *--****).

In various aspects, the access-control computing system 110 maintains, or otherwise accesses, the consent data stored on a consent repository. In addition, the access-control computing system 110 can generate a consent tag specific to the customer and provide the consent tag to the storage computing system 120, which the storage computing system 120 can append to any data records stored on the storage computing system 120 for the customer.

In certain aspects, the access-control computing system 110 provides a storage computing system 120 with consent tags that include data structures (e.g., an array) with relevant purpose, consent data, data types, and/or logical operations for corresponding customers. Accordingly, upon receiving a query from a client computing system 100, the storage computing system 120 can reference the data structures within the consent tags for the various customers in servicing the query. As a result, the storage computing system 120 can exclude data records for certain customers from the view of the dataset returned to the client computing system 100. In addition or alternatively, the storage computing system 120 can modify data displayed for one or more data elements of data records for certain customers found in the view of the dataset returned to the client computing system 100.

In additional or alternative aspects, the access-control computing system 110 provides a storage computing system 120 with consent tags that include references to appropriate consent data accessible and/or stored by the access-control computing system 110 for the corresponding customers. For instance, rather than a data structure, the access-control computing system 110 can provide a consent tag for a customer that includes a data subject identifier that can be used by the access-control computing system 110 to index consent data for the customer.

Returning to FIG. 2, here, the access-control computing system 110 can receive a request 221 that includes a data subject identifier from the storage computing system 120 for consent-based access-control policy data applicable to a customer (e.g., data subject) that has been identified as being responsive to the query received from the client computing system 100. The access-control computing system 110 uses the data subject identifier to generate the consent-based access-control policy data by accessing applicable consent data for the customer and using the applicable consent data to identify the appropriate consent-based access-control polic (ies) 212 and, where appropriate, associated logical operations. The access-control computing system 110 transmits the consent-based access-control policy data 213 to the storage computing system 120 for servicing the query.

In turn, the storage computing system 120 responds to the client computing system's 100 query by processing the query in accordance with the authorization token and consent-based access-process policy data 222 provided by the access-control computing system 110 to generate a modified view of the dataset for the customer and transmits the modified view of the dataset 223 to the client computing system 100. Accordingly, the access-control computing system 110 can provide the storage computing system 120 with consent-based access-control policy data 213 for other customers that have been identified as being responsive to the query. As a result, the client computing system 100 receives (e.g., has access to) the modified view of the dataset on the customers that can then be used by the application executing on the client computing system 100 in identifying which of the customers to send the promotional email, as well as coordinating the sending of the promotional email to the customers.

Thus, the access-control computing system 110 in various aspects addresses the technical challenge of implementing and managing access-control policies that involve purpose-based restrictions by producing a view of the dataset in accordance with such access-control policies. In some aspects, the access-control computing system 110 addresses this technical challenge by providing a client computing system 100 with an authorization token based on one or more purpose-based access-control policies to include in a query for a dataset sent to a storage computing system 120 that identifies the view of the dataset to return to the client computing system 100. For example, the access-control computing system 110 can provide an authorization token that identifies a view of the dataset in which each customer's social security number has been obfuscated since such data is not needed in sending the promotional emails.

In additional or alternative aspects, the access-control computing system 110 addresses the technical challenge of implementing and managing access-control policies that involve consent restrictions by tying consent tags for individual data subjects to data records stored, processed, transferred, and/or the like by data sources found on various storage computing systems 120. The consent tags and corresponding consent data can then be used in enforcing one or more applicable consent-based access-control policies for the data records.

In some aspects, the access-control computing system 110 can provide the storage computing system 120 with the consent tags that directly identify the applicable consent-based access-control policies or from which the storage computing system 120 can obtain the applicable consent-based access-control policies from the access-control computing system 110. For example, the access-control computing system 110 can provide the storage computing system 120 with consent tags for certain customers to provide a view of a dataset to the client computing system 100 that excludes records for the certain customers based on the consent tags indicating consent has not been obtained from these customers for receiving promotional emails.

It is noted that the data found within a dataset for which access control may be implemented and managed may not necessarily involve data that is considered personal and/or sensitive in nature but may also include other forms of data that may be of interest in which access control to the data is warranted and/or desired. For example, an organization may be interested in controlling access to data on the organization's various customers (e.g., customer list) that may be beneficial to a competitor if acquired. Such data may be considered important in controlling access to the data because the data is considered a trade secret. In addition, a data subject for which access to corresponding data is controlled may not necessarily be an individual but may be other entities such as a business, organization, government, association, and/or the like. Further detail is now provided on the configuration and functionality of the authorization token module 111, views module 112, consent tag module 113, and consent-based access-control policy data module 114 according to various aspects of the disclosure.

Authorization Token Module

Figure 3:
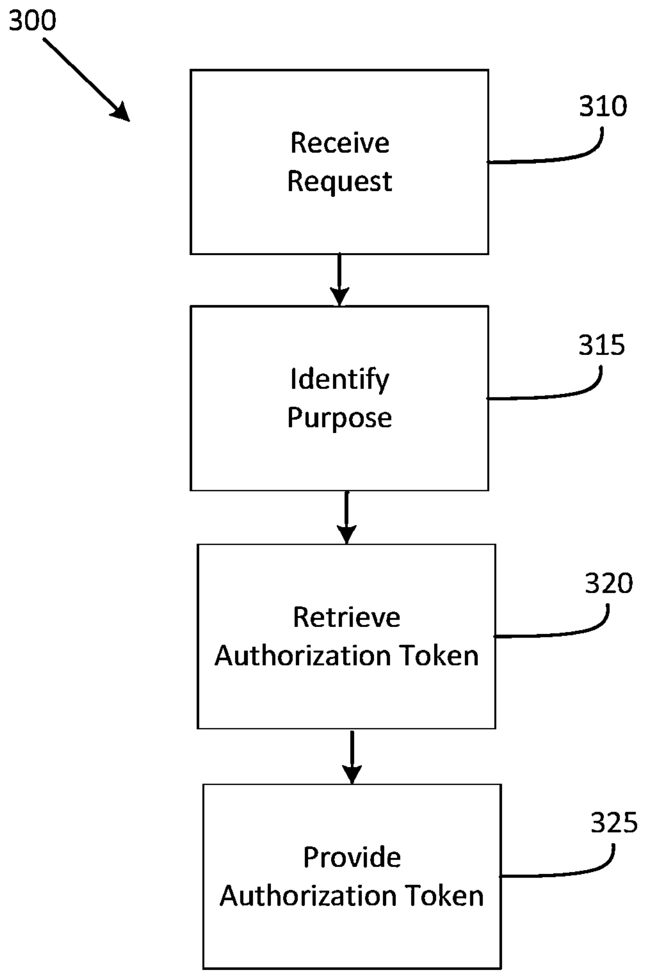
FIG. 3 is an example of a process for providing an authorization token in accordance with various aspects of the present disclosure.

Turning now to FIG. 3, additional details are provided regarding an authorization token module 111 for providing an authorization token for a dataset handled by a storage computing system 120 in accordance with various aspects of the disclosure. For instance, the flow diagram shown in FIG. 3 may correspond to operations carried out, for example, by computing hardware found in the access-control computing system 110 as described herein, as the computing hardware executes the views module 112.

A client computing system 100 (e.g., application executing thereon) may require access to a dataset handled by a storage computing system 120. Here, to gain access to the dataset, the client computing system 100 may be required to obtain an authorization token that provides access to an appropriate view of the dataset based on a purpose for requiring access to the dataset. For instance, the client computing system 100 may be requesting access to the dataset to query one or more data records found in the dataset to use in generating promotional emails to send to customers of an entity associated with the client computing system 100. For example, the entity may be a retailer wishing to send promotional emails to existing customers on Black Friday sale items available on the retailer's website. Here, the retailer may use a storage computing system 120 for handling a dataset that includes various data on the retailer's customers. Therefore, the retailer (e.g., retailer's client computing system 100) may need access to the dataset to facilitate sending the promotional emails to its customers.

The access-control computing system 110 may receive a request for the appropriate authorization token from the client computing system 100 directly or indirectly through the storage computing system 120. For example, the client computing system 100 may send a query to the storage computing system 120 and the storage computing system 120 may then send a request for the authorization token to the access-control computing system 110 on behalf of the client computing system 100. Therefore, the process 300 involves the authorization token module 111 receiving the request directly or indirectly from the client computing system 100 in Operation 310.

Once received, the authorization token module 111 identifies a purpose associated with the request in Operation 315. As previously noted, the access-control computing system 110 can generate and store a data model for the client computing system 100 that can be used in identifying the purpose associated with the request. For example, the data model can include one or more data attribute inventories that include attributes identifying various applications, processing activities, and/or the like of the client computing system 100 that are involved with the dataset. In addition, the one or more data attribute inventories can include attributes identifying purposes associated with the different applications, processing activities, and/or the like. Therefore, the authorization token module 111 can access the data model for the client computing system 100 and identify the purpose associated with the request received from the client computing system 100.

For example, the request may identify that a particular application executing on the client computing system 100 requires access to the dataset and the authorization token module 111, via the data model, may identify a particular purpose that is associated with the application. Additionally or alternatively, the authorization token module 111 can make this determination based on information in the data model associating certain projects, users, or processing activities thereof to certain purposes. For instance, the data model can include attributes that identify certain users of the client computing system 100 and also identify purposes for which these users can access certain data assets.

In Operation 320, the authorization token module 111 references the appropriate purpose-based access-control policy for the identified purpose and retrieves the corresponding authorization token. Once retrieved, the authorization token module 111 provides the token so that it can be used to gain access to the appropriate view of the dataset by the client computing system 100 in Operation 325. Depending on the circumstances, the access-control computing system 110 can provide the authorization token to the client computing system 100 or the storage computing system 120. For example, the access-control computing system 110 can provide the authorization token to the client computing system 100 and the client computing system 100 then includes the authorization token in a query transmitted to the storage computing system 120 to gain access to one or more data records of the dataset. In another example, the access-control computing system 110 can receive the query along with the request for the authorization token from the client computing system 100. The access-control computing system 110 can then forward the query along with the authorization token directly to the storage computing system 120 on behalf of the client computing system 100.

Views Module

Figure 4:
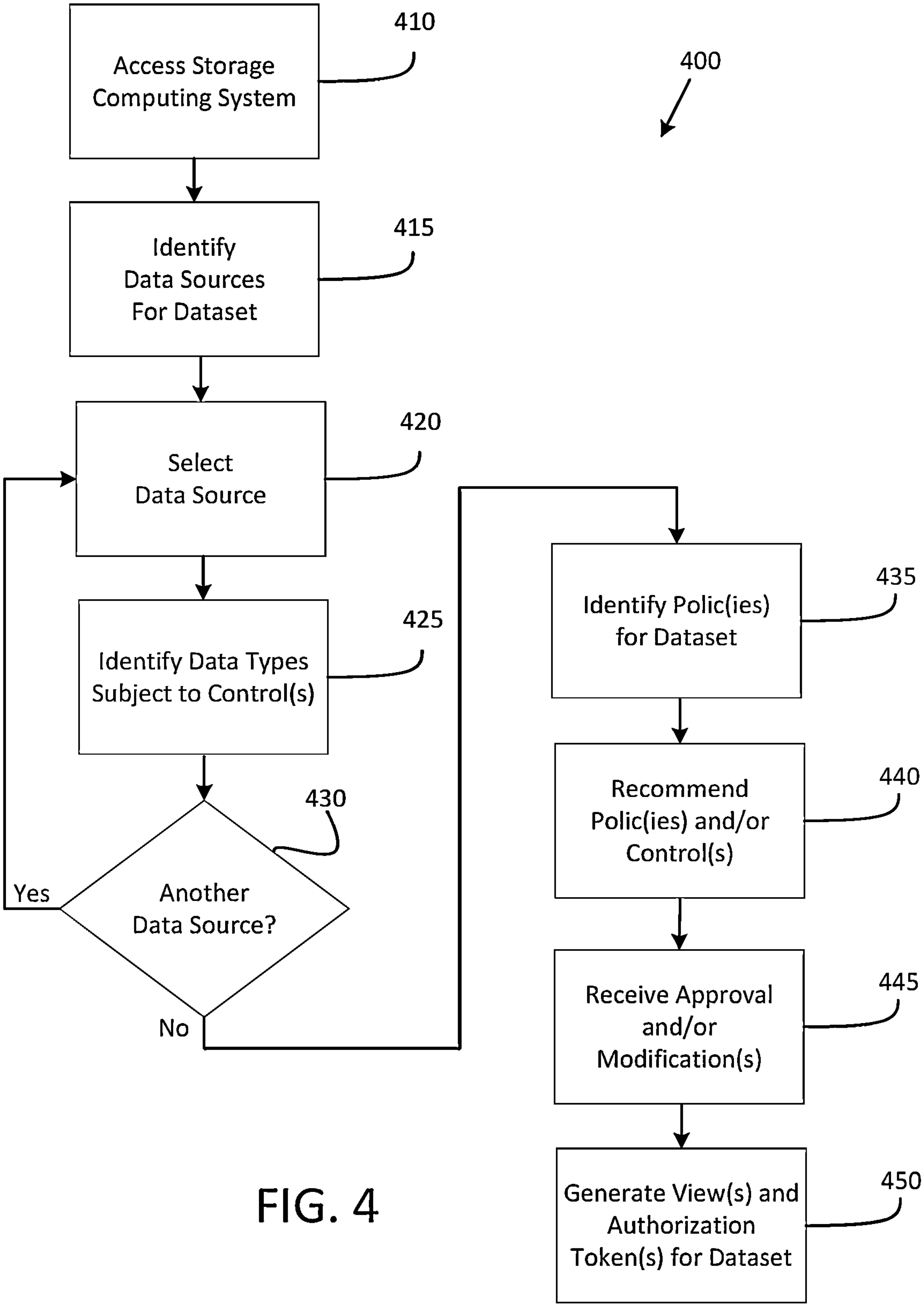
FIG. 4 is an example of a process for generating one or more views and authorization tokens for a dataset based on one or more purpose-based access-control policies in accordance with various aspects of the present disclosure.

Turning now to FIG. 4, additional details are provided regarding a views module 112 for generating views and corresponding authorization tokens for a dataset in accordance with various aspects of the disclosure. For instance, the flow diagram shown in FIG. 4 may correspond to operations carried out, for example, by computing hardware found in the access-control computing system 110 as described herein, as the computing hardware executes the views module 112.

The access-control computing system 110 may be assisting a storage computing system 120 in implementing and managing access control for a dataset being handled by the storage computing system 120 for the client computing system 100 through the use of access-control policies that impose restrictions on accessing the dataset based on purposes for accessing the dataset. As previously noted, the access-control computing system 110 may assist the storage computing system 120 in this capacity by generating views of the dataset that implement the various access-control policies, as well as authorization tokens that can be used by a client computing system 100 in accessing the different views. According to various aspects, the access-control computing system 110 accomplishes generating the views and corresponding authorization tokens via the views module 112.

In various aspects, the access-control computing system 110 can provide one or more interfaces (e.g., one or more graphical user interfaces) through which personnel of the client computing system 100 and/or the storage computing system 120 may access the access-control computing system 110 to initiate the process for generating the views for the dataset and corresponding authorization tokens. For example, the access-control computing system 110 may provide a website that is accessible over one or more networks 160 (e.g., the Internet) through which the personnel access the access-control computing system 110 to initiate the process.

Therefore, the process 400 involves the views module 112 accessing the storage computing system 120 in Operation 410. Here, the views module 112 can use credentials provided by a client computing system 100 or the storage computing system 120 (e.g., personnel thereof) to access the storage computing system 120. In Operation 415, the views module 112 identifies one or more data sources on the storage computing system 120 that are associated with the dataset (e.g., data sources on the storage computing system 120 that are associated with the one or more particular client computing system 100). A "data source" is understood to be a component used by the storage computing system 120 in handling the dataset. For example, a data source may be data storage (e.g., a repository, database, etc.), a computing device (e.g., a server, network router, switch, etc.), external data storage and/or computing device provided by a vendor, and/or the like.

In Operation 420, the views module 112 selects a data source from the one or more data sources. The views module 112 then identifies different data types found in the dataset and handled by the data source that should be subject to one or more purpose-based access-control policies in Operation 425. For example, the data source may store data found in the dataset that is considered personal identifiable information (PII) data or sensitive data. PII data may include, for example, an individual's (person's) social security number, email address, credit card number, etc. Here, each of these specific categories, classes, descriptions, and/or the like of PII data can be considered a "type" of PII data. PII data is often required to have access controls in place to ensure that the data is securely handled and to keep the data from being exposed to unauthorized entities. In some aspects, the views module 112 scans metadata on various data elements found in the data handled by the data source in identifying data types that should be subject to one or more purpose-based access-control policies. In particular aspects, the views module 112 can use a rules-based model in evaluating the data types (e.g., data elements and metadata thereof) in determining whether a particular data type should be subject to one or more purpose-based access-control policies. The rules-based model can make use of a set of rules that is applied to the different data types (e.g., metadata thereof) in determining whether a particular data type should be subject to one or more purpose-based access-control policies. The set of rules can be stored on one or more repositories 140 on the access-control computing system 110.

For instance, a data element may be considered a data field used in storing data found in the dataset that is handled by the data source. Here, the views module 112 can process the metadata for the data field using the rules-based model in identifying whether the field is used in storing a data type that should be subject to one or more purpose-based access-control policies. For example, the data field may be used in storing social security numbers of customers. The views module 112 can process metadata for the data field using the rules-based model and the set of rules used by rules-based model can include a rule that identifies a social security number as PII and therefore, should be subject to one or more purpose-based access-control policies.

In addition or alternative to identifying the data types that should be subject to one or more purpose-based access-control policies, the views module 112 can identify locations (e.g., data elements) in which the data types can be found for the data source. Further, the views module 112 can identify whether the data types are involved in a data transfer for the data source. For example, the data source (e.g., data storage) may be associated with a processing activity that involves transferring data stored in a particular data element found to store data for a data type that should be subject to one or more purpose-based access-control policies to a second, different data source (e.g., server). As a result, the views module 112 can identify additional data elements used for the data type.

Once the views module 112 has identified the data types associated with the data source that should be subject to one or more purpose-based access-control policies, the views module 112 determines at Operation 430 whether another data source has been identified for the storage computing system 120. If so, then the views module 112 returns to Operation 420, selects the next data source for the storage computing system 120, and identifies the data types associated with the newly selected data source that should be subject to one or more purpose-based access-control policies in the manner as just described.

After the views module 112 has evaluated one or more data sources for the storage computing system 120, the views module 112 identifies the one or more purpose-based access-control policies that should be applicable to the dataset in Operation 435. Here, in particular aspects, the access-control computing system 110 can store data on various purpose-based access-control policies in one or more repositories 140. Therefore, the views module 112 can access the data on the various purpose-based access-control policies and identify those policies that should be applicable to the dataset.

Similar to identifying the data types that should be subject to one or more purpose-based access-control policies, the views module 112 in various aspects can use a rules-based model that applies a set of rules in identifying which of the purpose-based access-control policies should be implemented for the identified data types. Again, the set of rules can be stored on one or more repositories 140 on the access-control computing system 110.

In some aspects, the views module 112 can have access to various purposes related to why the client computing system 100 may be requesting to access the dataset. For example, the access-control computing system 110 can be provided by the client computing system 100 (e.g., personnel thereof) with data on various applications, processing activities, and/or the like involving the client computing system 100 that make use of data found in the dataset. Accordingly, the storage computing system 120 in some aspects can use the data in constructing data models for the client computing system 100.

Here, for example, a data model can define (identify) the various data sources, applications, processing activities, and/or the like as data assets found within the client computing system 100 that are involved in handling the dataset. In addition, the data model can map relationships between and/or among the data assets. Further, the data model can define various attributes for the data assets. Attributes for a data asset can include, for example: (1) one or more departments within an entity that are responsible for the data asset; (2) identification of the dataset, itself; (3) purposes for handling the dataset; (4) one or more particular data subjects (or categories of data subjects) associated with the dataset handled by the data asset; (5) the particular data types for the dataset handled by the data asset; (6) one or more personnel (e.g., particular individuals and/or types of individuals) that are permitted to access the data asset; (7) which particular data types the personnel are allowed to access and use; (8) and/or the like. Therefore, the views module 112 can process the data on the various purpose-based access-control policies and the data models for the client computing system 100 using the rules-based model to identify those policies of the purpose-based access-control policies that should be applicable to the dataset.

In Operation 440, the views module 112 provides a recommendation on the identified purpose-based access-control policies to the client computing system 100 and/or storage computing system 120. For example, the views module 112 can provide the recommendation to personnel of the client computing system 100 and/or storage computing systems 120 through the one or more interfaces previously described. In another example, the views module 112 can provide the recommendation to the personnel by generating and sending one or more electronic communications, such as emails, to the personnel. Those of ordinary skill in the art can envision other mechanisms that can be used in providing the recommendation in light of this disclosure.

Upon receiving the recommendation, the personnel of the client computing system 100 and/or the storage computing system 120 can review the recommendation and make modifications to the recommendation if desired. The access-control computing system 110 can receive approval of and/or modifications to the recommendation from the personnel via the one or more interfaces and/or electronic communications and, in turn, the views module 112 receives the approval and/or modifications in Operation 445.

In response to receiving the approval and/or modifications, the views module 112 generates one or more views of the dataset and corresponding authorization tokens based on the recommendation and modifications in Operation 450. According to various aspects, the views module 112 generates a particular view of the dataset to implement one or more of the purpose-based access-control policies that are applicable to the dataset. For example, if the dataset includes PII and display of PII is not permitted for a particular purpose as indicated in an applicable purpose-based access-control policy, then the views module 112 can generate a first view of the dataset for the particular purpose that equates to a modified version of the dataset in which the PII is anonymized. Additionally or alternatively, a second particular purpose as indicated in the purpose-based access-control policy may allow viewing a masked version of the PII. Therefore, the views module 112 can generate a second view of the dataset for the second purpose that equates to a modified version of the dataset in which the PII is masked. In various aspects, the views module 112 generates appropriate instructions for constructing the views and transmits the appropriate instructions to the storage computing system 120. In turn, the storage computing system 120 can then create and store the views in accordance with the instructions.

In addition to the views, the views module 112 generates authorization tokens for the views. For example, an authorization token for a particular view may be an Application Programming Interface (API) Key, Open Authorization (OAuth), application token, and/or the like. Accordingly, a particular authorization token indicates that a certain view of the dataset handled by the storage computing system 120 can be accessed with the authorization token. For instance, if the access-control computing system 110 receives a request to access the dataset and determines that the request is linked to a first purpose, then the access-control computing system 110 provides the requesting client computing system 100 with a first authorization token that allows the client computing system 100 to access a view of the dataset corresponding to the first authorization token that is stored on the storage computing system 120.

Consent Tag Module

Figure 5:
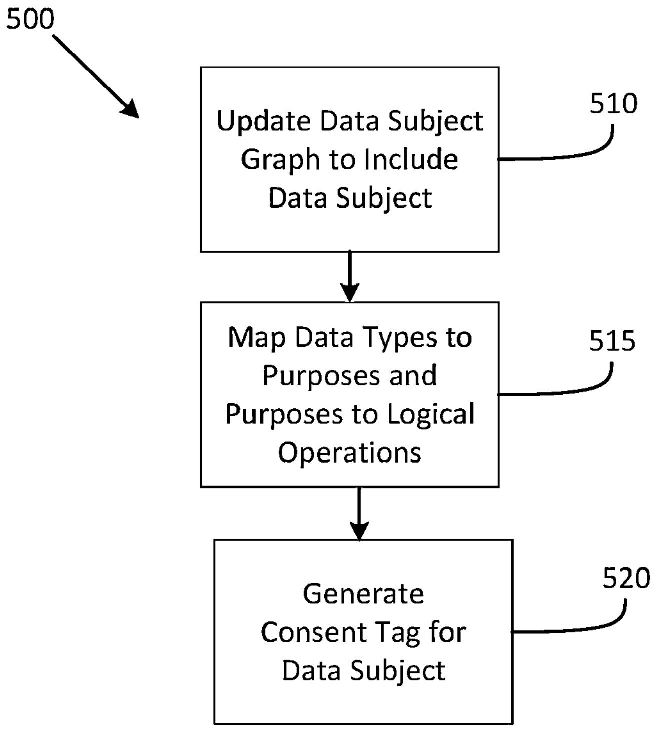
FIG. 5 is an example of a process for generating a consent tag for a data subject in accordance with various aspects of the present disclosure.

Turning now to FIG. 5, additional details are provided regarding a consent tag module 113 for generating a consent tag for a data subject having one or more data records found in a dataset in accordance with various aspects of the disclosure. For instance, the flow diagram shown in FIG. 5 may correspond to operations carried out, for example, by computing hardware found in the access-control computing system 110 as described herein, as the computing hardware executes the consent tag module 113.

Similar to the use of access-control policies that impose restrictions on accessing a dataset based on purposes, the access-control computing system 110 can also, or instead, assist a storage computing system 120 in implementing and managing access control for a dataset being handled by the storage computing system 120 for the client computing system 100 through the use of access-control policies that impose restrictions on accessing the dataset based on consent provided by data subjects. As previously noted, the access-control computing system 110 can assist the storage computing system 120 in this capacity by generating, based on data subjects' consent, consent tags that implement the various access-control policies that can be associated with data records found in the dataset for the data subjects. According to various aspects, the access-control computing system 110 accomplishes generating the consent tags via the consent tag module 113.

Similar to generating the views for the dataset, the access-control computing system 110 can provide one or more interfaces (e.g., one or mor graphical user interfaces) through which personnel of the client computing system 100 and/or the storage computing system 120 can access the access-control computing system 110 to initiate the process for generating consent tags for one or more data subjects. For example, the access-control computing system 110 can provide a website that is accessible over one or more networks 160 (e.g., the Internet) through which the personnel access the access-control computing system 110 to initiate the process. Here, the personnel may provide data on the one or more data subjects and the access-control computing system 110 can invoke the consent tag module 113 multiple times to generate a consent tag for each data subject of the one or more data subjects.

Therefore, the process 500 involves the consent tag module 113 receiving data for a particular data subject and updating a data structure (e.g., a data subject graph) to include identifiers for the data subject in Operation 510. Here, the data provided on the data subject may include various identifiers that can be used in identifying the data subject such as an email address, username, variants of the data subject's name, and/or the like. In addition, the consent tag module 113 can include the data sources on the storage computing system 120 that may handle data from the dataset that is associated with the data subject. Therefore, the data structure can be used in implementing one or more consent-based access-control policies for the data subject.

In Operation 515, the consent tag module 113 maps specific data types to respective purposes for accessing the dataset. Additionally or alternatively, the consent tag module 113 maps purposes for accessing the dataset to corresponding sets of logical operations for modifying certain data elements found in the dataset for the data subject. The logical operations can include, for example, operations for deleting, anonymizing, and/or removing data elements having certain data types for the data subject based on different types of consent found in consent data for the data subject (e.g., a "stop processing," "delete" or "opt-out" preference). As previously mentioned, the data subject's consent data can be stored on one or more consent repositories that are maintained by or otherwise accessible to the access-control computing system 110. For example, the client computing system 100 and/or storage computing system 120 can make use of a consent management computing system 130 that collects consent from data subjects through various activities involving the data subjects where requesting consent may be appropriate. The consent management computing system 130 may store consent data based on the consent received from the various data subjects on one or more repositories that are then accessible to the access-control computing system 110. In other instances, the access-control computing system 110 and consent management computing system 130 can be the same system. In addition or alternatively, the access-control computing system 110 can acquire consent data for the different data subjects and store the consent data on one or more repositories 140 on the access-control computing system 110.

In Operation 520, the consent tag module 113 generates a consent tag specific to the data subject. In various aspects, the consent tag module 113 generates the consent tag to include a data structure identifying relevant purpose and consent data for the data subject. The access-control computing system 110 then provides the consent tag to the storage computing system 120 and in turn, the storage computing system 120 appends the consent tag to any data records found in the dataset that are associated with the data subject. As a result, the storage computing system 120 can then use the consent tag in processing queries that involve data records found in the dataset for the data subject that are compliant with consent-based access-control policies that are applicable to the data records.

Figure 6:
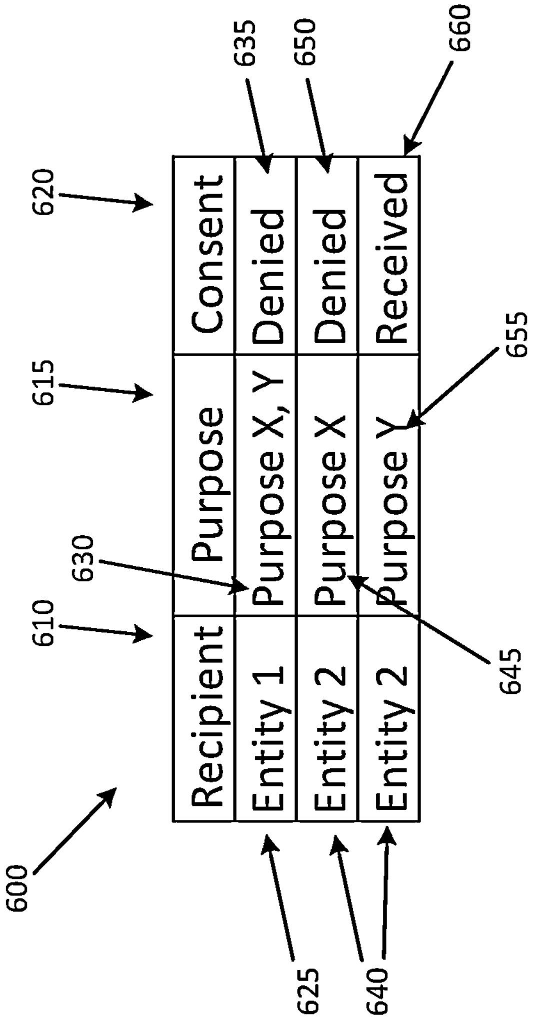
FIG. 6 depicts an example of a data structure of a consent tag in accordance with various aspects of the present disclosure.

In some aspects, each consent tag can include a data structure, such as an array, which provides a collection of relevant purpose and consent data for the corresponding data subject. Briefly turning to FIG. 6, a table 600 is provided of a simplified example demonstrating a data structure of relevant purpose and consent data for a data subject. Here, the data structure identifies various recipients 610, purposes 615, and consent data 620. The recipients 610 identify an entity who is requesting access to the dataset. For example, the entity may be associated with the client computing system 100 from which a query for the dataset is received. The purposes 615 identify specific purposes for which the recipients 610 are requesting access to the dataset. The consent data 620 indicates whether the data subject has provided consent for the combination of recipient 610 and purpose 615. Therefore, the data structure indicates the data subject has not consented 635 to access of the dataset by Entity 1 625 for Purposes X or Y 630, has not consented 650 to access of the dataset by Entity 2 640 for Purpose X 645, and has consented 660 to access of the dataset by Entity 2 640 for Purpose Y 655. In this example, the storage computing system 120 can reference the data structure within the consent tag when servicing queries from a client computing system 100 and exclude data records for the data subject from the query response if the client computing system 100 is associated with Entity 1.

In additional or alternative aspects, the consent tags can include data structures identifying other types of data in the relevant purpose and/or consent data. For instance, the data structure can identify corresponding logical operations to perform in implementing a particular consent-based access-control policy for a data subject. For example, instead of excluding a data subject's data records entirely when consent has not been received from the data subject for a particular purpose, data displayed for one or more data elements found in the data records may be modified. Therefore, the data structure may identify a logical operation for the particular purpose that indicates the modification to make to the data.

In additional or alternative aspects, logical operations may be applicable to one or more (e.g., all) of the data subjects and therefore such operations are stored in a data structure separate from the consent tags. For example, a data structure of logical operations can be provided for various purposes to perform when a data subject has not provided consent to having his or her data records found in the dataset access for the various reasons. Therefore, the storage computing system 120 may use a combination of a data subject's consent tag and the logical operations data structure identifying the logical operations to perform for the different purposes for processing the data subject's data records for a particular query.

Finally, in various aspects, the access-control computing system 110 provides updates to the consent tags as needed. For instance, the access-control computing system 110 can provide a new consent tag with an updated data structure if the access-control computing system 110 detects that the consent data for a particular data subject have been updated. For example, a change in the data subject's consent data may change the implementation of a particular consent-based access-control policy. Here, the access-control computing system 110 may receive a notice from the consent management computing system 130 that the consent data for the data subject has been updated.

Further, the access-control computing system 110 can provide a new consent tag with an updated data structure if the access-control computing system 110 detects that one or more data records found within the dataset have been updated. For example, a change in the data subject's data records may result in the application of a new consent-based access-control policy to the data subject's data records. Here, the access-control computing system 110 may receive a notice from the storage computing system 120 that the one or records have been updated.

Therefore, the access-control computing system 110 can provide the storage computing system 120 with a new consent tag in response to each detection of a triggering event such as a change in a data subject's consent data and/or data records. Further, in certain aspects, the access-control computing system 110 can provide a batch of updated consent tags to the storage computing system 120 at regular intervals. For example, the access-control computing system 110 may receive a notice of various data subjects who have had updates made to their consent data and the access-control computing system 110 can process the updated consent data for each of the data subjects using the consent tag module 113 accordingly.

Consent Tag Module

As previously noted, instead of including a data structure in a data subject's consent tag identifying the relevant purpose and consent data, a consent tag for a data subject can include a reference to appropriate consent data stored by the access-control computing system 110 for the data subject. For instance, rather than the data structure, the consent tag in various aspects can include a data subject identifier that is used by the access-control computing system 110 to index consent data for data subject. In these implementations, the access-control computing system 110 can receive a request from the storage computing system 120, when servicing a query from a client computing system 100, for consent-based access-control policy data applicable to data records for a data subject found in the dataset that have been identified as being responsive to the query.

Figure 7:
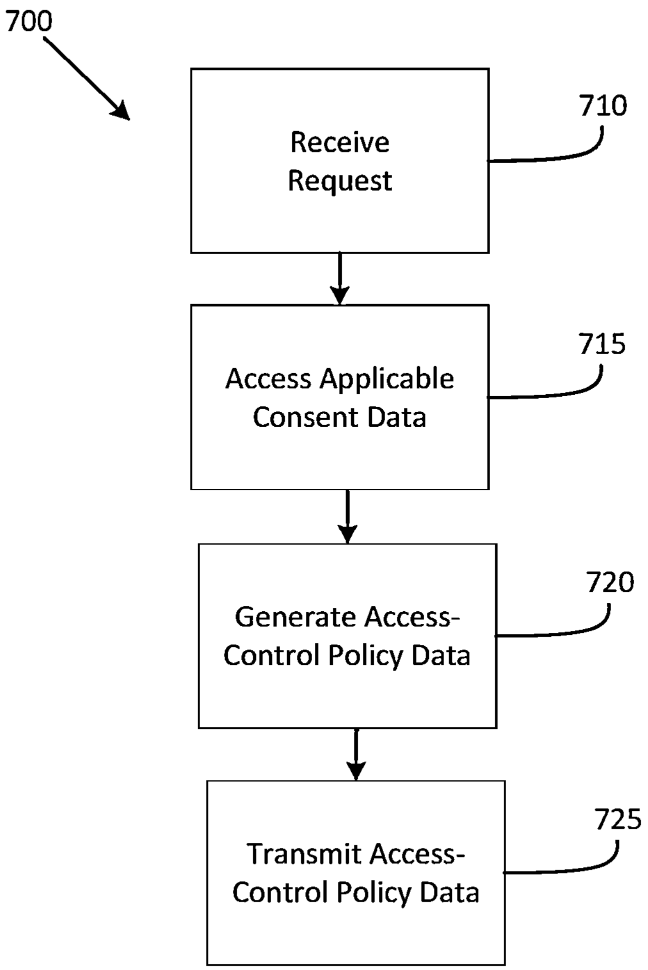
FIG. 7 is an example of a process for providing consent-based access-control policy data for a data subject in accordance with various aspects of the present disclosure.

Turning now to FIG. 7, additional details are provided regarding a consent-based access-control policy data module 114 for generating consent-based access-control policy data for a data subject in accordance with various aspects of the disclosure. For instance, the flow diagram shown in FIG. 7 may correspond to operations carried out, for example, by computing hardware found in the access-control computing system 110 as described herein, as the computing hardware executes the consent-based access-control policy data module 114.

The process 700 involves the consent-based access-control policy data module 114 receiving the request for the consent-based access-control policy data for the data subject that includes the data subject identifier in Operation 710. Here, for example, the identifier may be the data subject's name or some other type of identifying information for the data subject such as an email address, username, unique access code, and/or the like.

The consent-based access-control policy data module 114 uses the data subject identifier to access applicable consent data for that data subject in Operation 715. For example, the consent-based access-control policy data module 114 can query a data structure such as a data subject graph, as previously discussed, to identify the data subject's consent data (e.g., a location thereof). Depending on the circumstances, the data subject's consent data can be stored remotely, such as on a repository on a consent management computing system 130, or locally on a repository 140 on the access-control computing system 110.

Once the data subject's consent data has been retrieved, the consent-based access-control policy data module 114 uses the applicable consent data to identify the appropriate consent-based access-control policy and, where appropriate, associated logical operations. At Operation 720, the consent-based access-control policy data module 114 generates the consent-based access-control policy data for the data subject in accordance with the consent data, consent-based access-control policy, and/or associated logical operations. At Operation 725, the consent-based access-control policy data module 114 transmits the consent-based access-control policy data to the storage computing system 120 for servicing the query.

In turn, the storage computing system 120 can then respond to the query received from the client computing system 100 by providing a modified version of the data records found in the dataset for the data subject in accordance with the consent-based access-control policy data received from the access-control computing system 110. For instance, the storage computing system 120 could exclude the data subject's data records from the query response if the consent-based access-control policy data indicates that the data subject's data records cannot be used for a purpose and/or by an entity associated with the query.

Combination of Purpose-Based and Consent-Based Access-Control Policies

As noted and discussed throughout the disclosure, both purpose-based and consent-based access-control policies can be used in combination according to various aspects. For instance, the access-control computing system 110 can create a view of a dataset in accordance with a purpose-based access-control policy. For example, the access-control computing system 110 can create a view of a dataset where all credit card numbers for data subjects are masked and email addresses for the data subjects are visible. A client computing system 100 can then be granted access to the view of the dataset for a certain purpose. However, the access-control computing system 110 can further facilitate the view of the dataset being modified based on a consent-based access-control policy, such that the view only contains data records for data subjects that have provided suitable consent. Therefore, in the example, the access-control computing system 110 can facilitate the view being provided to the client computing system 100 with data records excluded where data subjects have not provided consent for the certain purpose, and data records included where data subjects have provided consent for the certain purpose but with masked credit card numbers in accordance with the purpose-based access-control policy.

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

According to various aspects, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to various aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 8:
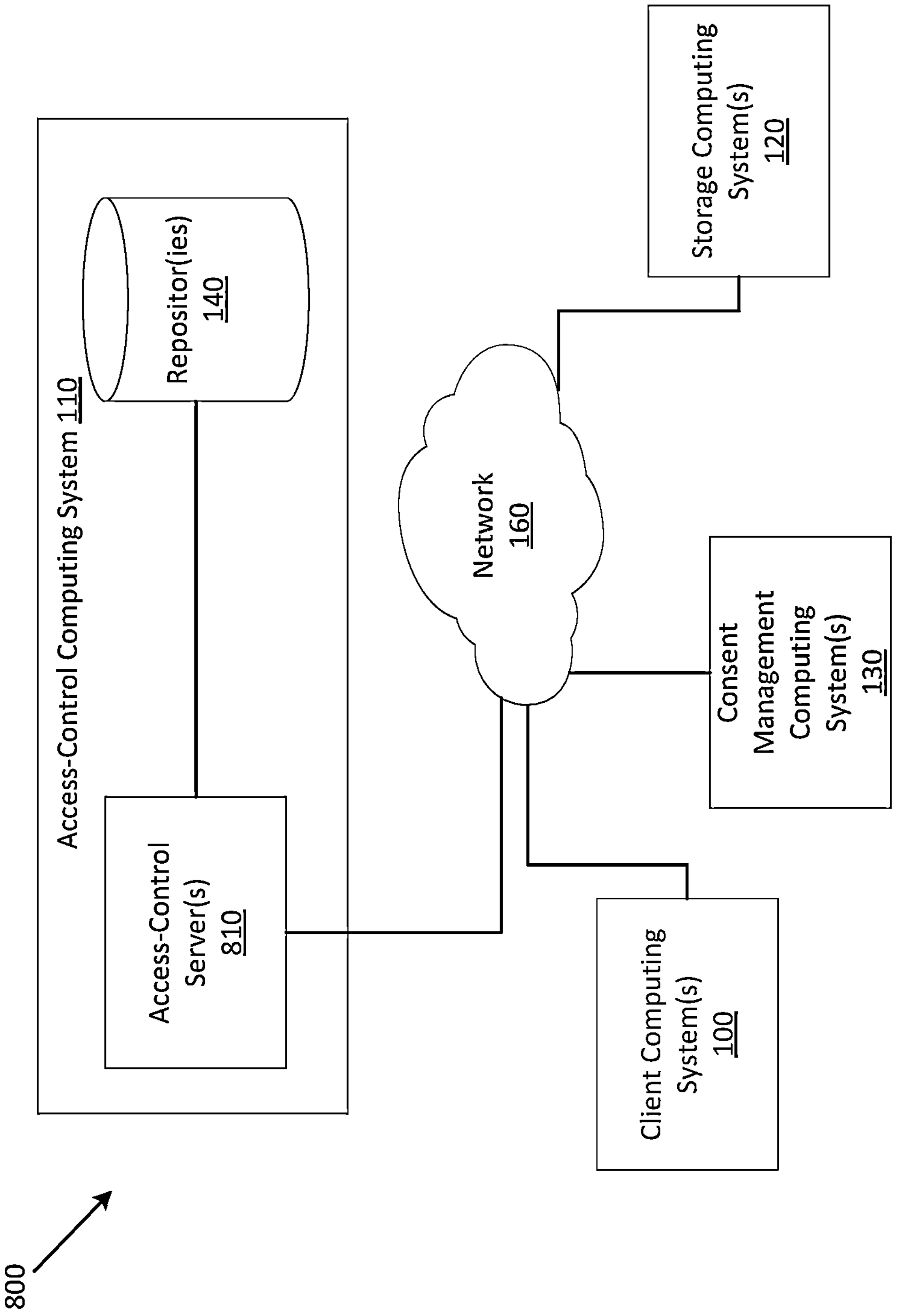
FIG. 8 is an example of a system architecture that may be used in accordance with various aspects of the present disclosure.

FIG. 8 is an example of a system architecture 800 that can be used in implementing and managing access controls for one or more datasets according to various aspects of the disclosure as described herein. Components of the system architecture 800 are configured according to various aspects to assist one or more storage computing systems 120 in implementing and managing access control to one or more datasets according one or more access-control policies based on purpose and/or consent restrictions. As may be understood from FIG. 8, the system architecture 800 can include an access-control computing system 110 that comprises one or more access-control servers 810 and one or more repositories 140. For example, the one or more repositories 140 can include a repository for storing data on various access-control policies and/or a repository for storing consent data for various data subjects as described herein. Although the access-control server(s) 810 and repositor(ies) 140 are shown as separate components, it should be understood that according to other aspects, these components 810, 140 can comprise a single server and/or repository, a plurality of servers and/or repositories, one or more cloud-based servers and/or repositories, or any other suitable configuration.

The access-control server(s) 810 can communicate, access, analyze, and/or the like with one or more client computing systems 100 and/or one or more storage computing systems 120 over one or more networks 160 as detailed herein. In addition, the access-control server(s) 810 can communicate, access, analyze, and/or the like with one or more consent management computing systems 130 as detailed herein. Further, the access-control server(s) 810 can execute an authorization token module 111, a views module 112, a consent tag module 113, and/or a consent-based access-control policy data module 114 as described herein. Finally, the access-control server(s) 810 can interface with the client computing system(s) 100, storage computing systems 120, and/or consent management computing system(s) 130 via one or more graphical user interfaces, suitable application programming interfaces (APIs), direct connections, and/or the like.

Example Computing Hardware

Figure 9:
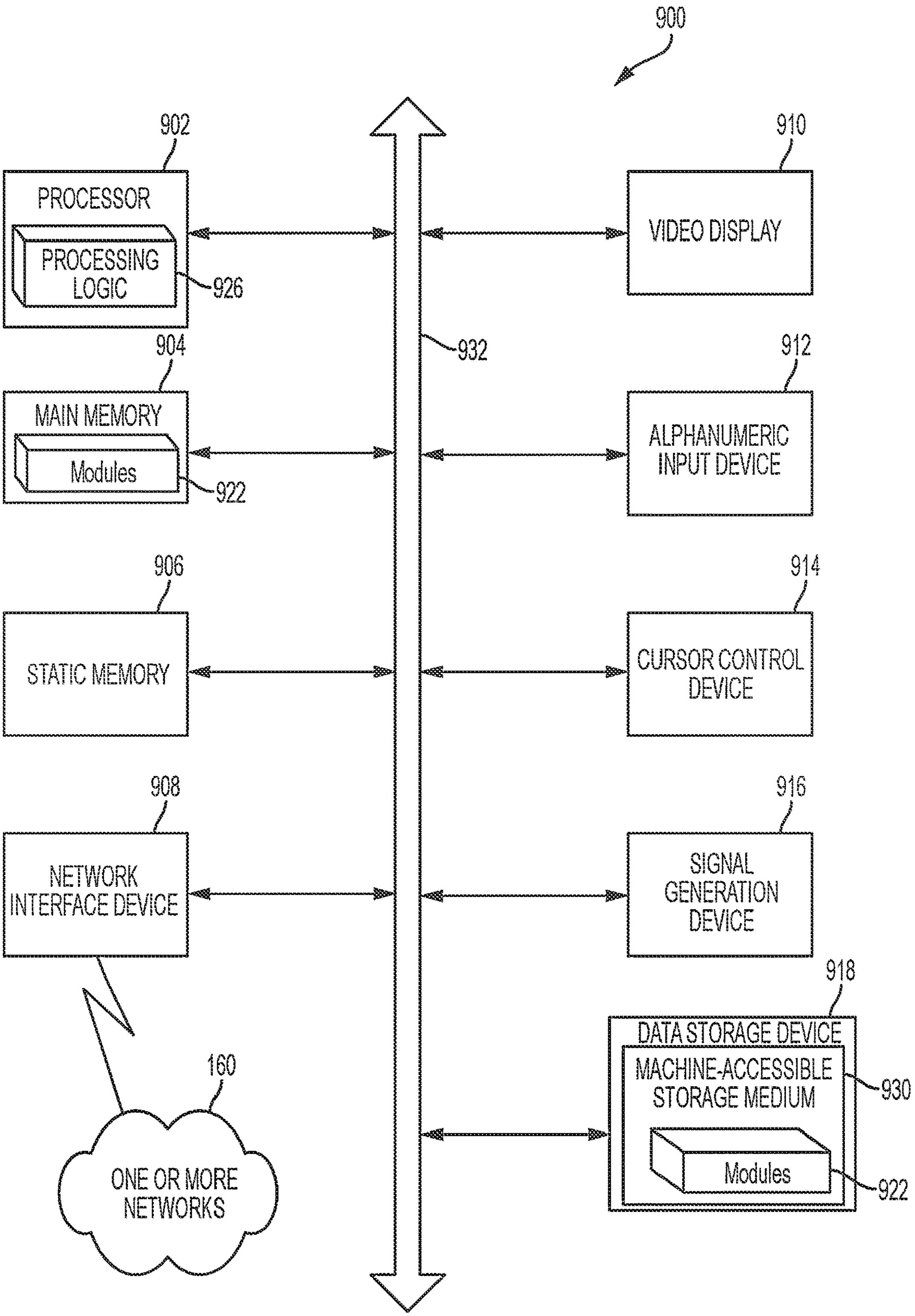
FIG. 9 is a schematic diagram of example computing entity that may be used in accordance with various aspects of the present disclosure.

FIG. 9 illustrates a diagrammatic representation of a computing hardware device 900 (also referred to as simply computing hardware) that may be used in accordance with various aspects of the disclosure. For example, the hardware device 900 may be computing hardware such as an access-control server 810 as described in FIG. 8. According to particular aspects, the hardware device 900 may be connected (e.g., networked) to one or more other computing entities, storage devices, and/or the like via one or more networks such as, for example, a LAN, an intranet, an extranet, and/or the Internet. As noted above, the hardware device 900 may operate in the capacity of a server and/or a client device in a client-server network environment, or as a peer computing device in a peer-to-peer (or distributed) network environment. According to various aspects, the hardware device 900 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 900 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 900 includes a processor 902 (also referred to as a processing device), a main memory 904 (e.g., read-only memory (ROM), flash memory, dynamic random-access memory (DRAM) such as synchronous DRAM (SDRAM), Rambus DRAM (RDRAM), and/or the like), a static memory 906 (e.g., flash memory, static random-access memory (SRAM), and/or the like), and a data storage device 918, that communicate with each other via a bus 932.

The processor 902 may represent one or more general-purpose processing devices such as a microprocessor, a central processing unit, and/or the like. According to some aspects, the processor 902 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 902 may be one or more special-purpose processing devices such as an application specific integrated circuit (ASIC), a field programmable gate array (FPGA), a digital signal processor (DSP), network processor, and/or the like. The processor 902 can execute processing logic 926 for performing various operations and/or steps described herein.

The hardware device 900 may further include a network interface device 908, as well as a video display unit 910 (e.g., a liquid crystal display (LCD), a cathode ray tube (CRT), and/or the like), an alphanumeric input device 912 (e.g., a keyboard), a cursor control device 914 (e.g., a mouse, a trackpad), and/or a signal generation device 916 (e.g., a speaker). The hardware device 900 may further include a data storage device 918. The data storage device 918 may include a non-transitory computer-readable storage medium 930 (also known as a non-transitory computer-readable storage medium or a non-transitory computer-readable medium) on which is stored one or more modules 922 (e.g., sets of software instructions) embodying any one or more of the methodologies or functions described herein. For instance, according to particular aspects, the modules 922 include an authorization token module 111, views module 112, consent tag module 113, and/or consent-based access-control policy data module 114 as described herein. The one or more modules 922 may also reside, completely or at least partially, within main memory 904 and/or within the processor 902 during execution thereof by the hardware device 900—main memory 904 and processor 902 also constituting computer-accessible storage media. The one or more modules 922 may further be transmitted or received over a network 160 via the network interface device 908.

While the computer-readable storage medium 930 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 900 and that causes the hardware device 900 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

Conclusion

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

The invention claimed is:

1. A method comprising:

receiving a request associated with an application that is executing on a client computing system and requesting access to a dataset comprising a plurality of data records handled by a storage computing system, wherein each data record of the plurality of data records comprises a plurality of data elements;

identifying, based on the application, a purpose for the application requesting access to the dataset;

referencing, based on the purpose, an applicable purpose-based access-control policy to identify an authorization token; and providing the authorization token to at least one of the client computing system or the storage computing system, wherein the storage computing system provides, based on the authorization token, the client computing system with a view of the dataset having a data element of the plurality of data elements returning modified data in a manner that is compliant with the applicable purpose-based access-control policy, wherein returning modified data in the manner that is compliant with the applicable purpose-based access-control policy comprises generating the modified data by at least one of anonymizing data returned for the data element, truncating the data returned for the data element, or obfuscating the data returned for the data element.

2. The method of claim 1, wherein identifying the purpose of the application requesting access to the dataset comprises:

accessing a data model for the client computing system, wherein the data model identifies a plurality of processing activities executing on the client computing system and involving the dataset;

identifying the application as a particular processing activity of the plurality of processing activities; and identifying the purpose based on an attribute defined in the data model for the particular processing activity.

3. The method of claim 1 further comprising:

accessing a plurality of data sources used on the storage computing system for handling the dataset;

identifying that the data element of the plurality of data elements is used for a type of data that is subject to the applicable purpose-based access-control policy;

generating the view of the dataset to have the data element containing the modified data in the manner that is compliant with the applicable purpose-based access-control policy; and generating the authorization token for the view of the dataset.

4. The method of claim 3, wherein generating the view of the dataset comprises providing the storage computing system with instructions to construct the view of the dataset on the storage computing system.

5. The method as recited in claim 1, further comprising providing a second authorization token to the at least one of the client computing system or the storage computing system, wherein the storage computing system provides, based on the second authorization token, the client computing system with a second view of the dataset that differs from the view of the dataset.

6. The method as recited in claim 5, wherein the second view excludes one or more data records that are present in the view of the dataset.

7. One or more non-transitory computer-readable media storing processor-executable instructions that, when executed by at least one processor, cause the at least one processor to:

receive a request associated with an application that is executing on a client computing system and requesting access to a dataset comprising a plurality of data records handled by a storage computing system, wherein each data record of the plurality of data records comprises a plurality of data elements;

identify, based on the application, a purpose for the application requesting access to the dataset;

reference, based on the purpose, an applicable purpose-based access-control policy to identify an authorization token; and provide the authorization token to at least one of the client computing system or the storage computing system, wherein the storage computing system provides, based on the authorization token, the client computing system with a view of the dataset having a data element of the plurality of data elements returning modified data in a manner that is compliant with the applicable purpose-based access-control policy, wherein returning modified data in the manner that is compliant with the applicable purpose-based access-control policy comprises generating the modified data by at least one of anonymizing data returned for the data element, truncating the data returned for the data element, or obfuscating the data returned for the data element.

8. The one or more non-transitory computer-readable media of claim 7, wherein the processor-executable instructions, that, when executed by the at least one processor, cause the at least one processor to identify the purpose of the application requesting access to the dataset further cause the at least one processor to:

access a data model for the client computing system, wherein the data model identifies a plurality of processing activities executing on the client computing system and involving the dataset;

identify the application as a particular processing activity of the plurality of processing activities; and identify the purpose based on an attribute defined in the data model for the particular processing activity.

9. The one or more non-transitory computer-readable media of claim 7, wherein the processor-executable instructions, when executed by the at least one processor, further cause the at least one processor to:

access a plurality of data sources used on the storage computing system for handling the dataset;

identify that the data element of the plurality of data elements is used for a type of data that is subject to the applicable purpose-based access-control policy;

generate the view of the dataset to have the data element containing the modified data in the manner that is compliant with the applicable purpose-based access-control policy; and generate the authorization token for the view of the dataset.

10. The one or more non-transitory computer-readable media of claim 7, wherein the processor-executable instructions, that, when executed by the at least one processor, cause the at least one processor to generate the view of the dataset, further cause the at least one processor to provide the storage computing system with instructions to construct the view of the dataset on the storage computing system.

11. The one or more non-transitory computer-readable media of claim 7, wherein the processor-executable instructions, when executed by the at least one processor, further cause the at least one processor to provide a second authorization token to the at least one of the client computing system or the storage computing system, wherein the storage computing system provides, based on the second authorization token, the client computing system with a second view of the dataset that differs from the view of the dataset.

12. The one or more non-transitory computer-readable media of claim 11, wherein the second view excludes one or more data records that are present in the view of the dataset.

13. An apparatus comprising:

one or more processors; and memory storing processor-executable instructions that, when executed by the one or more processors, cause the apparatus to:

receive a request associated with an application that is executing on a client computing system and requesting access to a dataset comprising a plurality of data records handled by a storage computing system, wherein each data record of the plurality of data records comprises a plurality of data elements;

identify, based on the application, a purpose for the application requesting access to the dataset;

reference, based on the purpose, an applicable purpose-based access-control policy to identify an authorization token; and provide the authorization token to at least one of the client computing system or the storage computing system, wherein the storage computing system provides, based on the authorization token, the client computing system with a view of the dataset having a data element of the plurality of data elements returning modified data in a manner that is compliant with the applicable purpose-based access-control policy, wherein returning modified data in the manner that is compliant with the applicable purpose-based access-control policy comprises generating the modified data by at least one of anonymizing data returned for the data element, truncating the data returned for the data element, or obfuscating the data returned for the data element.

14. The apparatus of claim 13, wherein the processor-executable instructions, that, when executed by the one or more processors, cause the apparatus to identify the purpose of the application requesting access to the dataset further cause the apparatus to:

access a data model for the client computing system, wherein the data model identifies a plurality of processing activities executing on the client computing system and involving the dataset;

identify the application as a particular processing activity of the plurality of processing activities; and identify the purpose based on an attribute defined in the data model for the particular processing activity.

15. The apparatus of claim 13, wherein the processor-executable instructions, when executed by the one or more processors, further cause the apparatus to:

access a plurality of data sources used on the storage computing system for handling the dataset;

identify that the data element of the plurality of data elements is used for a type of data that is subject to the applicable purpose-based access-control policy;

generate the view of the dataset to have the data element containing the modified data in the manner that is compliant with the applicable purpose-based access-control policy; and generate the authorization token for the view of the dataset.

16. The apparatus of claim 13, wherein the processor-executable instructions, that, when executed by the one or more processors, cause the apparatus to generate the view of the dataset, further cause the apparatus to provide the storage computing system with instructions to construct the view of the dataset on the storage computing system.

17. The apparatus of claim 13, wherein the processor-executable instructions, when executed by the one or more processors, further cause the apparatus to provide a second authorization token to the at least one of the client computing system or the storage computing system, wherein the storage computing system provides, based on the second authorization token, the client computing system with a second view of the dataset that differs from the view of the dataset.

18. The apparatus of claim 17, wherein the second view excludes one or more data records that are present in the view of the dataset.

* * * * *